(12) United States Patent
Ozaki et al.

(10) Patent No.: US 8,129,066 B2
(45) Date of Patent: Mar. 6, 2012

(54) FUEL CELL EXHIBITING ENHANCED HYDROGEN DISTRIBUTION DENSITY

(75) Inventors: Toru Ozaki, Chiba (JP); Fumiharu Iwasaki, Chiba (JP); Kazutaka Yuzurihara, Chiba (JP); Tsuneaki Tamachi, Chiba (JP); Takafumi Sarata, Chiba (JP); Norimasa Yanase, Chiba (JP)

(73) Assignee: Seiko Instruments Inc. (JP)

( * ) Notice: Subject to any disclaimer, the term of this patent is extended or adjusted under 35 U.S.C. 154(b) by 819 days.

(21) Appl. No.: 12/083,170

(22) PCT Filed: Oct. 5, 2006

(86) PCT No.: PCT/JP2006/319928
§ 371 (c)(1),
(2), (4) Date: Apr. 7, 2008

(87) PCT Pub. No.: WO2007/043423
PCT Pub. Date: Apr. 19, 2007

(65) Prior Publication Data
US 2009/0023031 A1    Jan. 22, 2009

(30) Foreign Application Priority Data
Oct. 7, 2005   (JP) .................. 2005-294939

(51) Int. Cl.
*H01M 8/04*   (2006.01)
*H01M 8/24*   (2006.01)

(52) U.S. Cl. ........ 429/456; 429/457; 429/458; 429/512; 429/514

(58) Field of Classification Search .................. 429/513, 429/514, 457, 492, 460, 495, 485, 483, 480, 429/456, 458, 512; 324/309
See application file for complete search history.

(56) References Cited

U.S. PATENT DOCUMENTS

| | | | |
|---|---|---|---|
| 2003/0044672 A1* | 3/2003 | Fukumoto et al. | 429/40 |
| 2003/0148159 A1* | 8/2003 | Cox et al. | 429/30 |
| 2004/0110054 A1 | 6/2004 | Bourgeois et al. | 429/38 |
| 2004/0224190 A1* | 11/2004 | Sasahara et al. | 429/12 |
| 2004/0247991 A1* | 12/2004 | Suzuki et al. | 429/44 |
| 2005/0196660 A1 | 9/2005 | Tsushima et al. | 429/34 |

FOREIGN PATENT DOCUMENTS

| | | |
|---|---|---|
| DE | 19853911 | 5/2000 |
| JP | 2001/307754 A1 * | 11/2001 |
| JP | 2005216581 | 8/2005 |

OTHER PUBLICATIONS

Machine Translation of JP 2001/307754 A1, Nishihara et al., Nov. 2, 2001.*
Machine Translation of DE 19853911 A1, Riensche et al., May 25, 2000.*

* cited by examiner

*Primary Examiner* — Jonathan Crepeau
*Assistant Examiner* — Kenneth Douyette
(74) *Attorney, Agent, or Firm* — Adams & Wilks

(57) ABSTRACT

This invention provides a fuel battery comprising a solid polymer electrolyte membrane, an anode-side catalyst body and a cathode-side catalyst body disposed respectively on both sides of the solid polymer electrolyte membrane, and a fuel guide part in which the anode-side catalyst body is disposed opposite to the anode-side catalyst body on the opposite side where the anode-side catalyst body faces the solid polymer electrolyte membrane and which guides a fuel which has been externally supplied toward the center of the face of the anode-side catalyst body.

18 Claims, 18 Drawing Sheets

FUEL CELL EXHIBITING ENHANCED HYDROGEN DISTRIBUTION DENSITY

CROSS-REFERENCE TO RELATED APPLICATION

This application is a U.S. national stage application of International Application No. PCT/JP2006/319928, filed Oct. 5, 2006, claiming a priority date of Oct. 7, 2005, and published in a non-English language.

TECHNICAL FIELD

The present invention relates to a fuel cell having a solid polymer electrolyte membrane and an anode-side catalyst body and a cathode-side catalyst body disposed on opposite surfaces of the solid polymer electrolyte membrane.

BACKGROUND ART

A fuel cell system is known, particularly, in which a membrane electrode assembly (hereinafter, referred to as MEA) generates electricity from hydrogen induced to an anode side of a fuel cell and oxygen induced to a cathode side thereof.

In the past, in the fuel cell system, hydrogen was supplied to a flow path formed on a separator.

However, in such a flow path structure, a hydrogen density distribution is formed from the vicinity of an introduction port through which hydrogen is introduced toward the vicinity of a discharge port through which hydrogen is discharged. The density of hydrogen supplied to an anode-side catalyst body on the MEA becomes uneven, thereby causing an output voltage to fluctuate and thus lowering the output voltage.

In order to solve the problem, a technology has been suggested in which a plurality of protrusions are formed on a separator in order to obtain a uniform hydrogen density distribution by the pattern of the plural protrusions (see JP-A-2002-117870)

Herein, the above-mentioned hydrogen density distribution represents the total hydrogen mass contained in a unit volume; the same meaning is applied to the following description.

SUMMARY OF THE INVENTION

A supply mechanism for supplying hydrogen described in the above-mentioned patent document includes, similar to the conventional flow path structure, an introduction port for introducing hydrogen and a discharge port for discharging hydrogen in the vicinity of the edges of the anode-side catalyst body. In addition, the supply mechanism includes an induction path between the introduction port and the discharge port so as to enable hydrogen to be uniformly diffused over the entire surface of the anode-side catalyst body.

In such a supply mechanism, the introduction port and the discharge port are disposed in the vicinities of the mutually opposing edges of the anode-side catalyst body; therefore, a large distance is defined between them. For this reason, the density of hydrogen gradually lowers from the vicinity of the introduction port toward the discharge port; hence, at a portion of the anode-side catalyst body where the hydrogen density is relatively low, the output voltage is decreased lower than that of other portions. As a result, it is difficult to increase the overall output voltage of the fuel cell.

The present invention has been made to solve such problems, and its object is to provide a fuel cell capable of suppressing unevenness in a hydrogen density distribution, thereby increasing an output voltage.

To achieve the above object, in accordance with a first aspect of the present invention, there is provided a fuel cell including a solid polymer electrolyte membrane; an anode-side catalyst body and a cathode-side catalyst body disposed on opposite surfaces of the solid polymer electrolyte membrane; and a fuel inducing portion disposed on a side opposite to the side at which the anode-side catalyst body is opposed to the solid polymer electrolyte membrane so as to be opposed to the anode-side catalyst body, thereby inducing fuel supplied from the outside, toward the center of the surface of the anode-side catalyst body.

According to the above aspect, since the fuel is diffused in a radial shape from the center of the anode-side catalyst body, the area where the hydrogen density is uneven becomes smaller than that when the hydrogen is supplied from the introduction port provided at the edge of the anode-side catalyst body. As a result, it is possible to increase an overall output voltage of the fuel cell.

In accordance with a second aspect of the present invention, the fuel inducing portion includes a mechanism for decelerating the speed of fuel lower than that when the fuel was supplied from the outside.

In accordance with a third aspect of the present invention, the fuel cell of the present invention includes a mechanism for inducing the fuel supplied from the outside toward the anode-side catalyst body along a direction of a normal line of the surface of the anode-side catalyst body.

In accordance with a fourth aspect of the present invention, a fuel inducing portion as the above-described mechanism includes an anode-side member disposed apart from the anode-side catalyst body so as to be opposed to the anode-side catalyst body, and the anode-side member includes a through pore at a position corresponding to the center of the surface of the anode-side catalyst body.

In accordance with a fifth aspect of the present invention, a plurality of the anode-side catalyst bodies and a plurality of the through pores are provided, and the through pores are provided at positions corresponding to the centers of the respective surfaces of the anode-side catalyst bodies.

In accordance with a sixth aspect of the present invention, the fuel cell of the present invention includes a plurality of the anode-side catalyst bodies and a plurality of the through pores, wherein the through pores are provided at positions corresponding to the centers of the respective surfaces of the anode-side catalyst bodies, wherein the fuel inducing portion includes an introduction path through which the fuel is supplied; and induction paths connected to the introduction path and through which the fuel supplied to the introduction path is induced to the through pores, wherein the introduction path includes a terminating port connected to the induction paths, wherein the plural induction paths include a first induction path and second induction paths of which the lengths from the terminating port toward the through pores are longer than that of the first induction path, and wherein the first induction path has a cross section smaller than those of the second induction paths.

In accordance with a seventh aspect of the present invention, the fuel cell of the present invention includes a plurality of the anode-side catalyst bodies and a plurality of the through pores, wherein the through pores are provided at positions corresponding to the centers of the respective surfaces of the anode-side catalyst bodies, wherein the fuel inducing portion includes: an introduction path through which the fuel is supplied; and an induction path connected to the introduction path and through which the fuel supplied to the introduction path is induced to the through pores, wherein the introduction path includes a terminating port connected to the induction path, wherein the plural through pores include a first through pore and second through pores that are disposed at positions at which the distances to the terminating port are longer than that of the first through pore, and wherein the first through pore has an area smaller than those of the second through pores.

In accordance with an eighth aspect of the present invention, there is provided a fuel cell including a solid polymer electrolyte membrane; an anode-side catalyst body and a cathode-side catalyst body disposed on opposite surfaces of the solid polymer electrolyte membrane; and a fuel inducing portion disposed on a side opposite to the side at which the anode-side catalyst body is opposed to the solid polymer electrolyte membrane so as to be opposed to the anode-side catalyst body, thereby inducing fuel supplied from the outside toward plural locations of the surface of the anode-side catalyst body.

According to the above aspect, since a plurality of through pores is provided, an overall opening area can be increased larger than that when only one through pore is provided. With this arrangement, the flow rate of the fuel discharged from the through pores can be decelerated to be lower than that when only one through pore is provided. Therefore, the fuel can be sprayed at substantially uniform pressure with respect to the anode-side catalyst body. Accordingly, it is possible to make the fuel density distribution on the anode-side catalyst body more uniform.

In accordance with a ninth aspect of the present invention, the fuel inducing portion includes a mechanism for decelerating the speed of fuel lower than that when the fuel was supplied from the outside.

In accordance with a tenth aspect of the present invention, the fuel cell of the present invention includes a mechanism for inducing the fuel supplied from the outside along a direction of a normal line of the surface of the anode-side catalyst body.

In accordance with an eleventh aspect of the present invention, the fuel inducing portion as the above-described mechanism includes an anode-side member disposed apart from the anode-side catalyst body so as to be opposed to the anode-side catalyst body, and the anode-side member includes through pores at positions corresponding to the plural locations of the surface of the anode-side catalyst body.

In accordance with a twelfth aspect of the present invention, the fuel cell of the present invention includes three or more through pores, wherein the anode-side member includes a polygonal surface formed by the lines passing through the three or more through pores, and wherein in a front view of the anode-side member, the polygonal surface is disposed as a position overlapping the center of gravity the surface of the anode-side catalyst body.

In accordance with a thirteenth aspect of the present invention, there is provided a fuel cell system including the fuel cell according to any one of the above-described aspects, and a fuel supply portion supplying the fuel to the fuel inducing portion of the fuel cell.

DETAILED DESCRIPTION OF THE INVENTION

Figure 1:
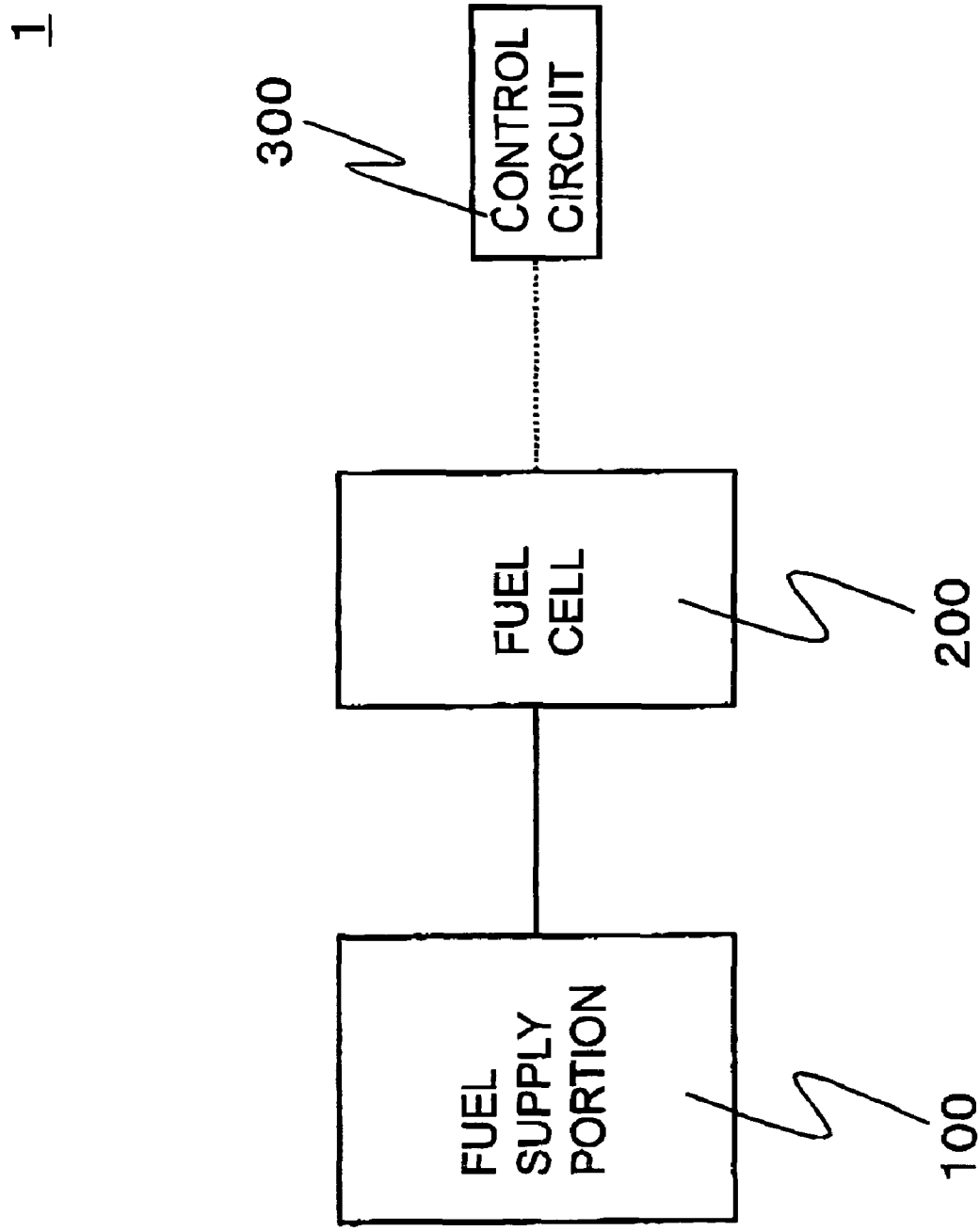
FIG. 1 is a diagram showing the structure of a fuel cell system according to the present invention.

Now, embodiments of a fuel cell according to the present invention will be described in detail with reference to the drawings. In the drawings, the same or similar elements are denoted by the same reference numerals even though they are depicted in different drawings.

Embodiment 1

FIG. 1 shows the structure of a fuel cell system according to the present invention.

In FIG. 1, a fuel cell system 1 includes a fuel supply portion 100, a fuel cell 200, and a control circuit 300.

The fuel supply portion 100 may have any structure that can generate hydrogen, and may have a structure in which hydrogen generating substance and hydrogen generation accelerating substance are mixed with each other to discharge hydrogen. Preferably, the fuel supply portion 100 may have a structure in which sodium borohydride as hydrogen generating substance and a malic acid solution as hydrogen generation accelerating substance are mixed with each other to discharge hydrogen.

As a combination of the hydrogen generating substance and the hydrogen generation-accelerating substance, besides the above-mentioned example, the hydrogen generating substance may be any metal hydrides that can be hydrolyzed and the hydrogen generation accelerating substance may be any hydrogen generation catalysts such as an organic acid, an inorganic acid, or ruthenium.

In addition, the hydrogen generating substance may be a solution of sodium borohydride and the hydrogen generation accelerating substance may be malic acid powder. As such, the combination of the hydrogen generating substance and the hydrogen generation accelerating substance can be appropriately selected as long as the mixture thereof can generate hydrogen.

In addition, the reaction used in the hydrogen generating portion may use any combination of metal and a basic or acid solution.

Furthermore, in the hydrogen generating portion, any structure that can generate hydrogen from hydrolysis may be used including a methanol reforming type wherein hydrogen is obtained from alcohols, ethers, or ketones by stem reforming and a hydrocarbon reforming type wherein hydrogen is obtained from hydrocarbons such as gasoline, kerosene, or natural gas by stem reforming.

As a modified example of the hydrogen generating portion, a structure using hydrogen absorbing alloys or a hydrogen storage tank may be used.

The control circuit 300 is connected to the fuel cell 200. The control circuit 300 is driven by a voltage supplied from the fuel cell 200.

Figure 2:
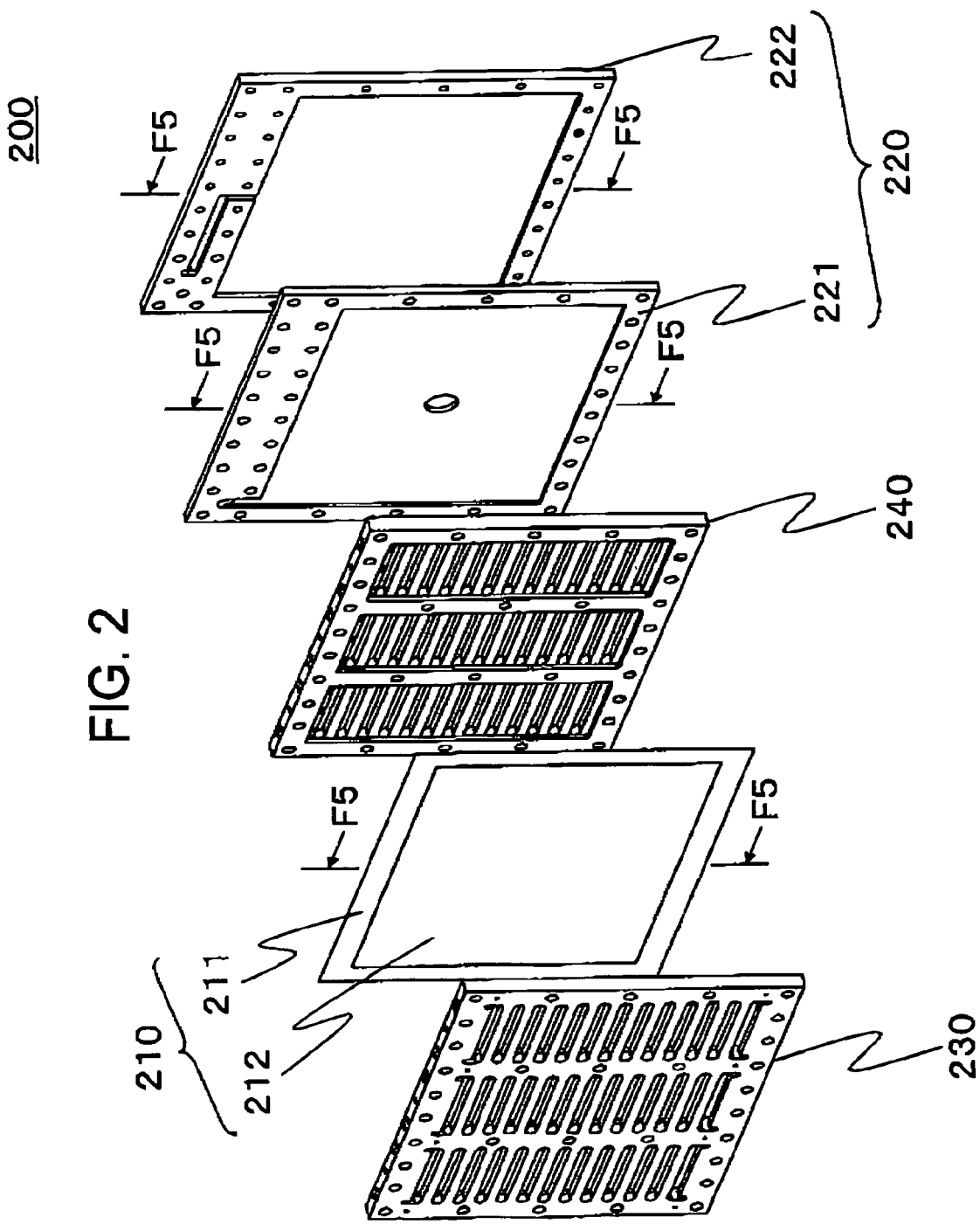
FIG. 2 is a diagram showing an example of an exploded perspective view of a fuel cell according to a first embodiment.

FIG. 2 is an exploded perspective view showing an example of the fuel cell 200. As shown in FIG. 2, the fuel cell 200 includes an MEA 210, a fuel inducing portion 220, a cathode-side pressing member 230, and an anode-aide pressing member 240. The fuel cell 200 also includes a gas diffusion member (not shown) and a current collector (not shown), disposed on the anode side and the cathode side of the MEA 210, respectively.

The MEA 210 includes a solid polymer electrolyte membrane 211 and a cathode-side catalyst body 212 and an anode-side catalyst body (not shown) disposed on opposite surfaces of the solid polymer electrolyte membrane 211. The anode-side catalyst body has substantially the same shape and size as the cathode-side catalyst body 212.

In FIG. 2, the MEA 210 has an outside dimension of 80×63×0.03 mm, and the cathode- and anode-side catalyst bodies have a size of 70×53×0.03 mm.

The fuel inducing portion 220 is disposed on a side opposite to the side at which the anode-side catalyst body is opposed to the solid polymer electrolyte membrane 211 and induces fuel supplied from the outside toward the center of the surface of the anode-side catalyst body. In addition, the fuel inducing portion 220 may have a function of decelerating the speed of hydrogen lower than that when the hydrogen was supplied from the outside.

In this embodiment, the fuel inducing portion 220 is disposed on the MEA 210 close to the anode-side catalyst body substantially in parallel to the anode-side catalyst body. The fuel inducing portion 220 includes an anode-side member 221 disposed apart from the anode-side catalyst body so as to be opposed to the anode-side catalyst body. The fuel inducing portion 220 also includes a fuel introducing member 222 that is disposed on a side opposite to the side at which the anode-side member 221 is opposed to the anode-side catalyst body and that temporarily stores therein fuel introduced thereto by using the anode-side member 221.

The cathode-side pressing member 230 and the anode-side pressing member 240 are all provided with a penetration portion for inducing fuel toward the MEA 210 and sandwich the MEA 210, the gas diffusion member (not shown), and the current collector (not shown) between them.

In FIG. 2, by way of example, lattice-shaped penetration portions are formed in the cathode-side pressing member 230 and the anode-side pressing member 240. It is to be noted that the penetration portion is not limited to such a lattice shape and any shape that can pass fuel through it can be used.

In addition, the cathode-side pressing member 230 and the anode-side pressing member 240 may have different shapes. Moreover, the materials of the cathode-side pressing member 230 and the anode-side pressing member 240 may be an insulating material such as a plastic or a ceramic and an electrically conductive material such as metal.

Further, the current collector may not be provided in the fuel cell 200; in such a case, the cathode-side pressing member 230 and the anode-side pressing member 240 are made of a material having electrically conductive properties.

Figure 3:
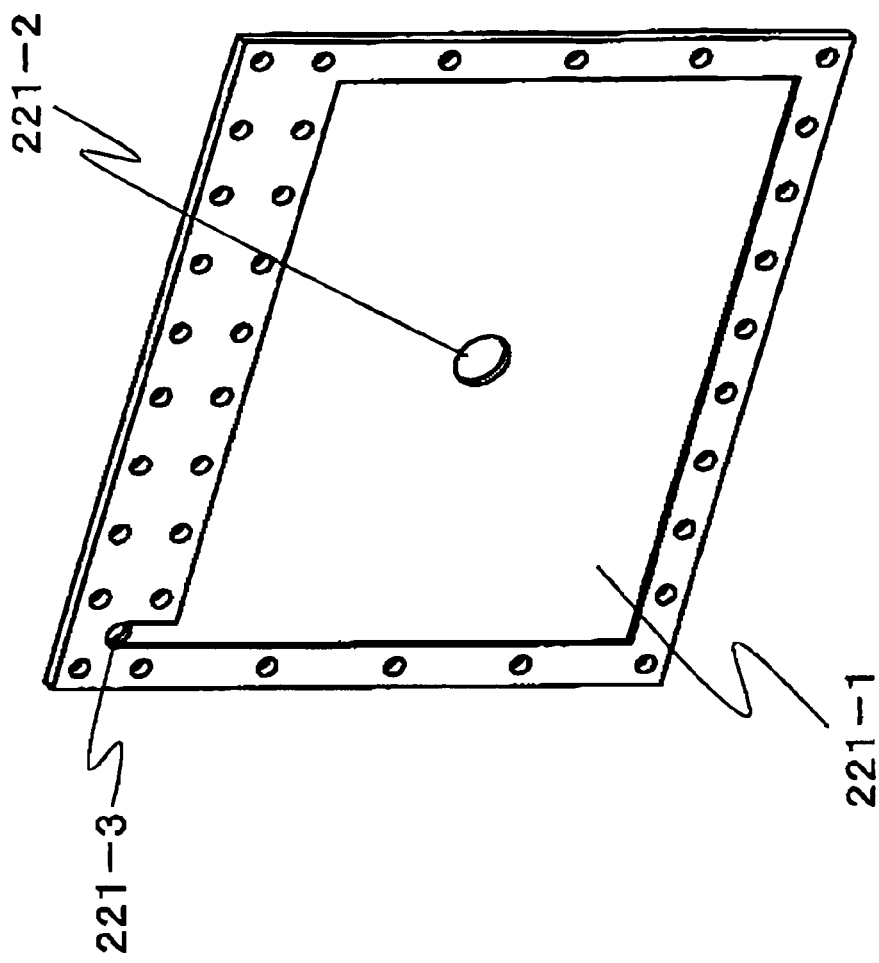
FIG. 3 is a perspective view showing the structure of an anode-side member of the fuel cell according to the first embodiment.

FIG. 3 is a perspective view showing the structure of the anode-side member 221 of the fuel cell 200 shown in FIG. 2. The anode-side member 221 includes a recess portion 221-1 provided on a plate-shaped member close to the anode-side catalyst body, a through pore (through hole) 221-2, and a first discharge port 221-3.

The recess portion 221-1 is formed to a predetermined depth from a front surface when the anode-side member 221 is viewed from the front surface, i.e., from the anode-side catalyst body side.

The bottom surface of the recess portion 221-1 is preferably in parallel to the surface of the anode-side catalyst body; however, the invention is not particularly limited to this and, for example, the bottom surface may be inclined with respect to the surface of the anode-side catalyst body. Moreover, the size of the bottom surface of the recess portion is preferably greater than that of the anode-side catalyst body.

The through pore 221-2 is preferably circular shaped. In this embodiment, the through pore 221-2 is located on a normal line of the anode-side catalyst body surface drawn from the center (the center of gravity) of the anode-side catalyst body.

In addition, the through pore 221-2 may have other shapes than the above-mentioned circular shape; even in such cases, the center of the through pore 221-2 is located on the normal line described above.

The anode-side member 221 shown in FIG. 3 has an outside dimension of 80×70×1.5 mm, and the recess portion 221-1 has a depth of 0.5 mm from the front surface in a front view of the anode-side member 221 and has a dimension of 70×53 mm.

Further, the through pore 221-2 has a diameter $\phi$ of 10 mm.

The first discharge port 221-3 is provided to discharge water flowing into the anode-side catalyst body from the cathode-side catalyst body during electricity generation to the outside. In addition, it is to be noted that absence of the first discharge port 221-3 does not limit the functions described in the present invention.

Figure 4:
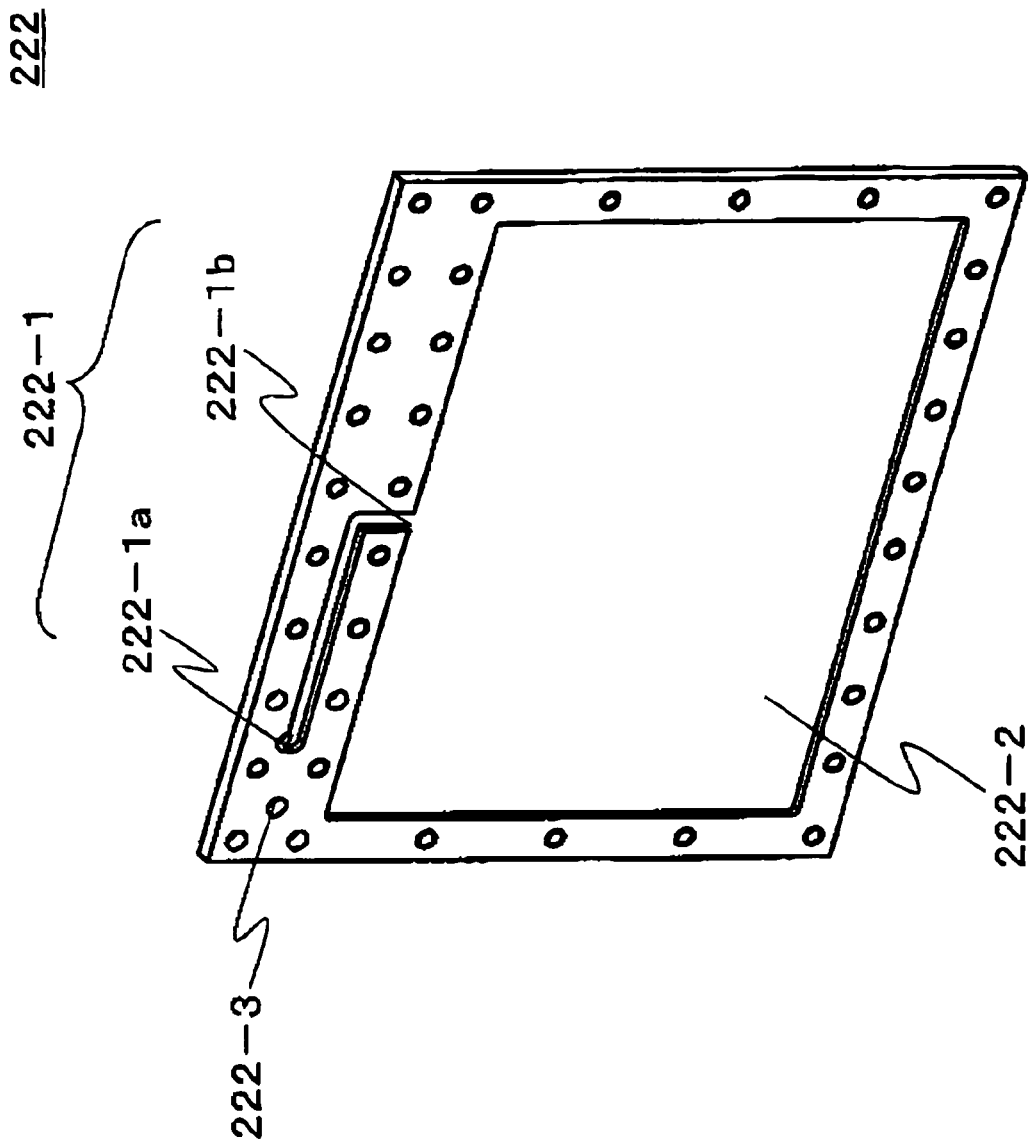
FIG. 4 is a perspective view showing the structure of a fuel introducing member of the fuel cell according to the first embodiment.

FIG. 4 is a diagram showing the structure of the fuel introducing member 222 of the fuel cell 200 shown in FIG. 2. The fuel introducing member 222 includes an introduction path 222-1, an induction path 222-2, and a second discharge port 222-3.

The introduction path 222-1 includes an introduction port 222-1a, which is a connecting portion to an external fuel supply portion 100 for introducing hydrogen from the outside, and a terminating port 222-1b, which is an end portion of the introduction path close to the induction path 222-2 described after.

The introduction port 222-1a may be provided so as to penetrate the fuel introducing member 222 from the rear surface to the front surface in the front view thereof as shown in FIG. 4 and may be provided on the lateral surface thereof. Alternatively, the introduction port 222-1a may be provided within the area of the induction path 222-2 described after.

When the introduction port 222-1a is provided outside the area of the induction path 222-2, the terminating port 222-1b of the introduction path 222-1 is provided on the lateral surface in the front view of the induction path 222-2.

In FIG. 4, the terminating port 222-1b is provided at the center of the upper surface in the front view of the induction path 222-2; however, the position of the terminating port 222-1b is not particularly limited to this position, but the terminating port 222-1b may be provided at any position on the lateral surface of the induction path 222-2.

The induction path 222-2 is connected to the introduction path 222-1 and induces hydrogen supplied to the introduction path 222-1 toward the through pore 221-2. In this embodiment, the induction path 222-2 includes a recess portion formed into a plate shape and provided on the anode-side catalyst body side.

Specifically, the hydrogen is temporarily stored in a space formed between the recess portion and a surface of the anode-side member 221 opposite to the anode-side catalyst body, and then the hydrogen is induced to the through pore 221-2 formed in the anode-side member 221.

Since the introduced hydrogen is temporarily stored in the induction path 222-1, the flow rate of the hydrogen discharged via the induction path 222-1 through the through pore 221-2 is decelerated to be lower than the flow rate of the hydrogen when it was introduced. With this arrangement, the hydrogen discharged through the through pore 221-2 is diffused at substantially uniform pressure with respect to the anode-side catalyst body. For this reason, it is possible to make the hydrogen density distribution on the anode-side catalyst body more uniform and thus to increase an overall output voltage of the fuel cell.

In addition, the induction path 222-2 only needs to have a flow path for inducing hydrogen toward the through pore 221-2 and does not necessarily have the recess portion. The induction path 222-2 may, for example, have a tube shape or a pipe shape that connects the terminating port 222-1b to the through pore 221-2.

The second discharge port 222-3 is provided to induce the water discharge from the first discharge port 221-3 formed in the anode-side member 221 to flow further out to the outside. In addition, it is to be noted that absence of the second discharge port 222-3 does not limit the functions described in the present invention.

Figure 5:
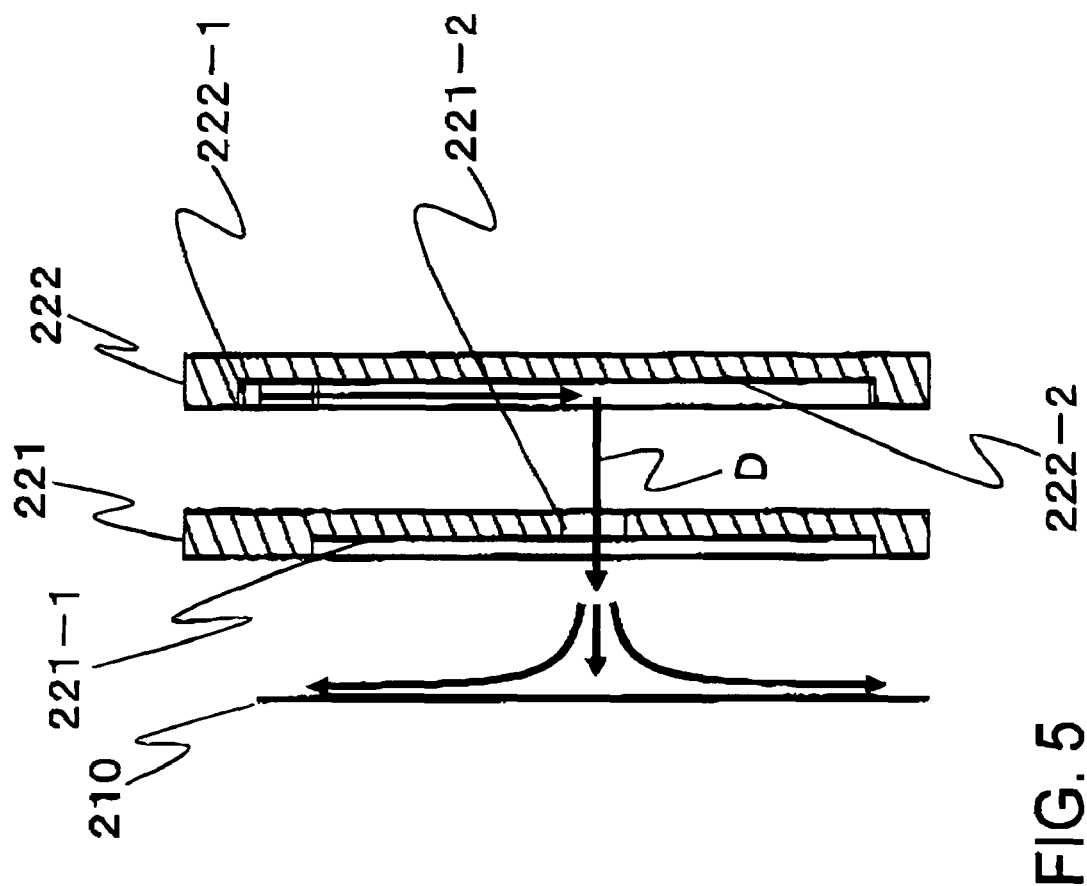
FIG. 5 is a diagram showing the flow of hydrogen in the F5-F5 cross section of FIG. 2.

FIG. 5 is a diagram showing the F5-F5 cross section of FIG. 2, in which the flowing direction of hydrogen is denoted by D.

In FIG. 5, the cathode-side pressing member 230 and the anode-side pressing member 240 are not shown for the sake of simple explanation because they do not have influence on the hydrogen flow.

Specifically, the hydrogen is introduced to the induction path 222-2 through the introduction path 222-1 provided in the fuel introducing member 222. Then, the hydrogen is sprayed from the induction path 222-2 toward the anode-side catalyst body of the MEA 210 through the through pore 221-2 formed in the anode-side member 221.

The fuel introducing member 222 shown in FIG. 4 has an outside dimension of 80×70×2 mm, and the induction path 222-2 has a depth of 1 mm from the front surface in a front view of the fuel introducing member 222 and has a dimension of 70×53 mm.

Figure 6:
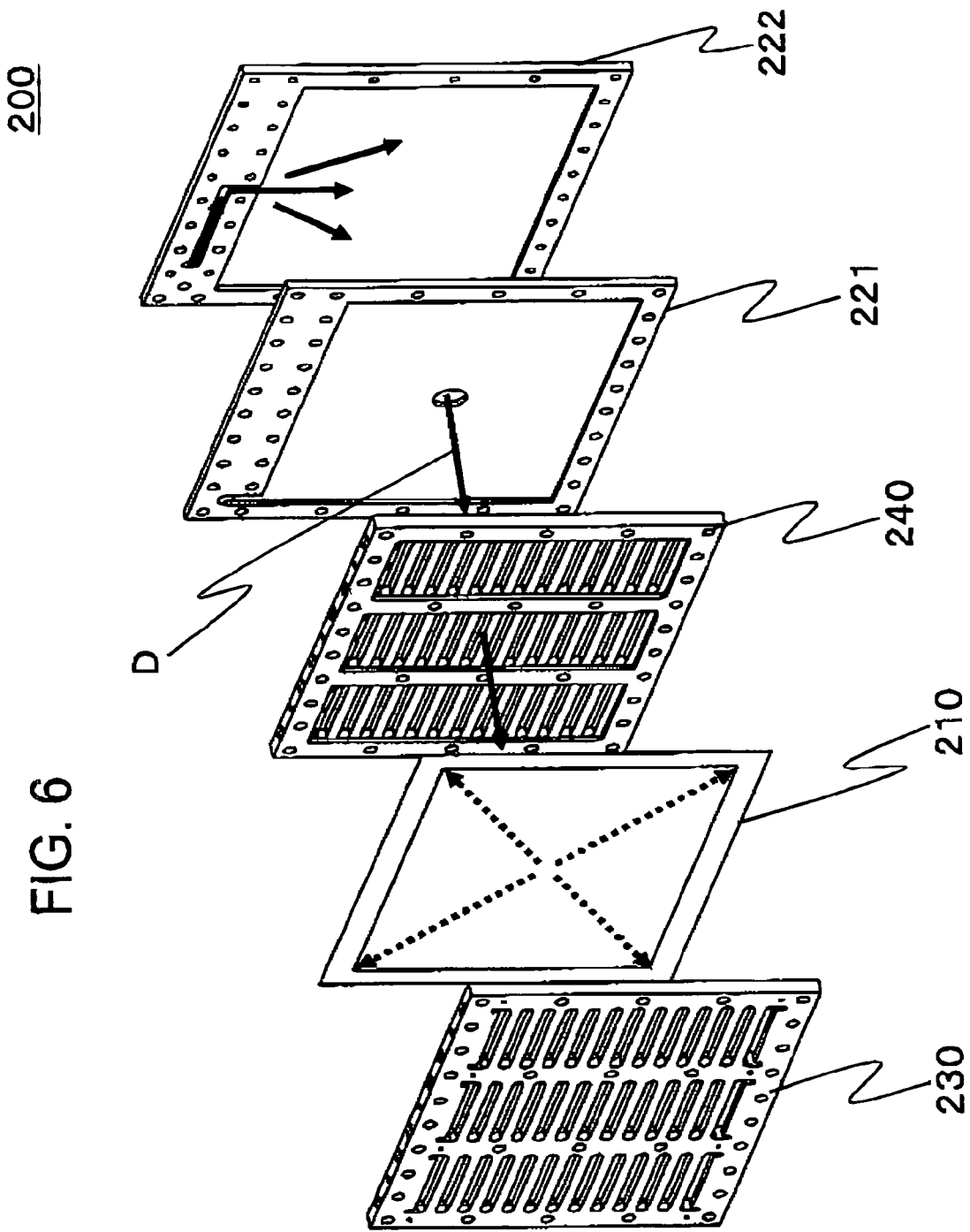
FIG. 6 is a diagram showing the flow of hydrogen in the fuel cell according to the present invention.

FIG. 6 is an exploded perspective view of the fuel cell shown in FIG. 2, for explaining the flowing direction D of hydrogen. The flow of hydrogen before it reaches the MEA 210 has been described with reference to FIG. 5, therefore, redundant descriptions thereof will be omitted.

As shown in FIG. 6, the hydrogen sprayed onto the MEA 210 is diffused in a radial shape over the surface of the anode-side catalyst body and is supplied to the entire surface of the anode-side catalyst body.

According to the embodiment described above, since the fuel is diffused in a radial shape from the center of the anode-side catalyst body, the area where the hydrogen density is uneven becomes smaller than that when the hydrogen is supplied from the introduction port provided at the edge of the anode-side catalyst body. As a result, it is possible to suppress fluctuation of an output voltage and thus to increase an overall output voltage of the fuel cell.

In particular, as shown in FIGS. 5 and 6, since the hydrogen introduced from the outside is sprayed onto the anode-side catalyst body along a direction of a normal line of the surface of the anode-side catalyst body, the sprayed hydrogen is diffused in a radial shape to the anode-side catalyst body at a substantially uniform flow rate. With this arrangement, compared with the case where the hydrogen introduced from the outside is not moved in the direction of the normal line, when the hydrogen is moved in the direction of the normal line, it is possible to suppress unevenness of the hydrogen density distribution on the anode-side catalyst body and thus to increase the overall output voltage of the fuel cell.

In addition, since the introduced hydrogen is temporarily stored in the induction path 222-1, the flow rate of the hydrogen discharged via the induction path 222-1 from the through pore 221-2 is decelerated to be lower than the flow rate of the hydrogen when it was introduced. With this arrangement, the hydrogen discharged through the through pore 221-2 is diffused at substantially uniform pressure with respect to the anode-side catalyst body. For this reason, it is possible to make the hydrogen density distribution on the anode-side catalyst body more uniform and thus to increase an overall output voltage of the fuel cell.

Further, since the above-mentioned effect can be obtained when only one introduction port 222-1a is provided in the fuel introducing member 222, it is easy to decrease the overall size of the fuel cell system, thereby increasing the volume output density.

In addition, since a micro flow path structure is not needed, it is possible to provide easy processing properties.

Modified Example 1

In the first embodiment, hydrogen is sprayed toward the center of the surface of a single anode-side catalyst body. To the contrary, in a first modified example, hydrogen is sprayed toward the centers of the surfaces of a plurality of anode-side catalyst bodies. The first modified example will be described in detail below.

Figure 7:
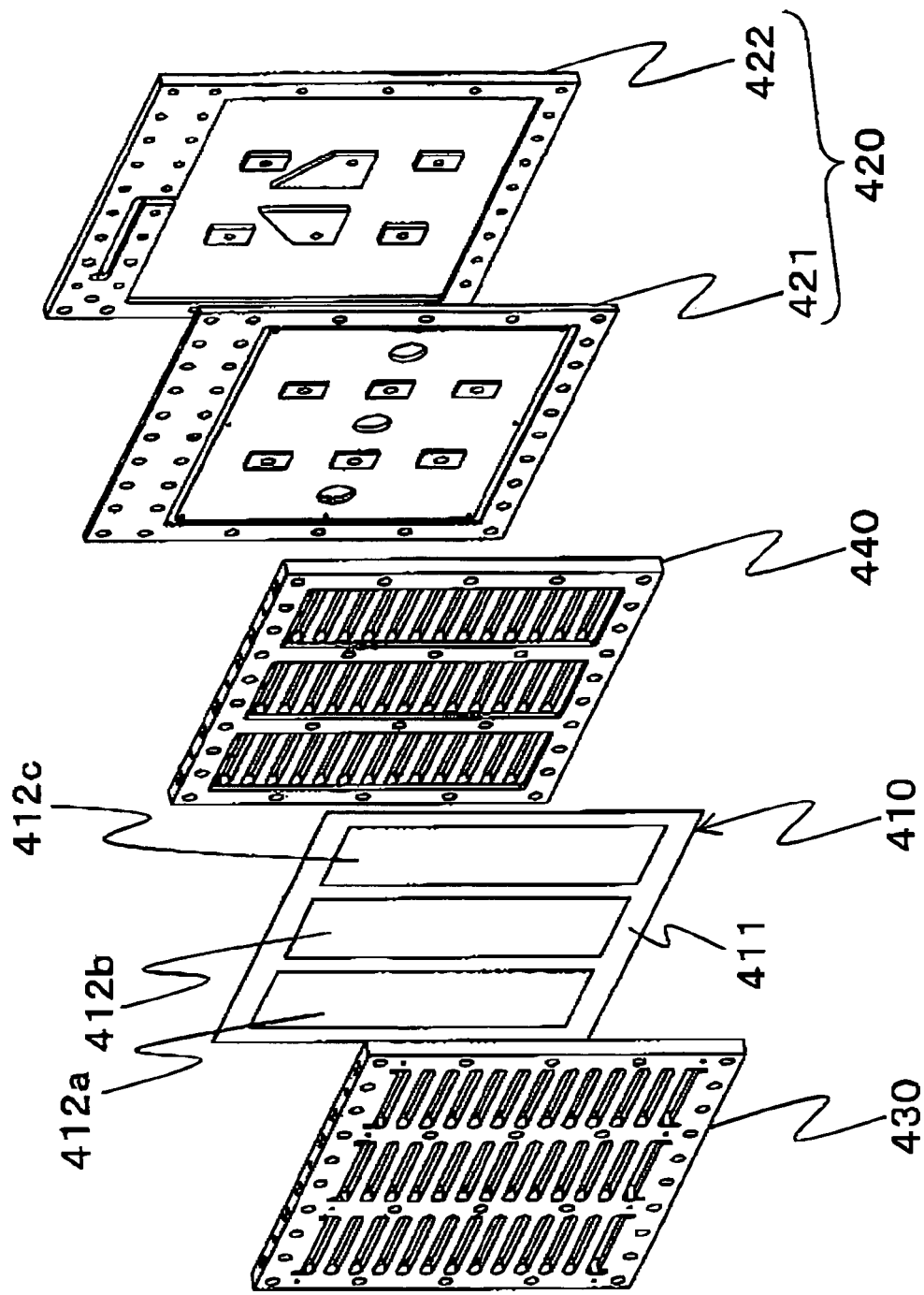
FIG. 7 is a diagram showing an example of an exploded perspective view of a fuel cell according to a first modified example of the first embodiment.

FIG. 7 is a drawing showing a first modified example of the first embodiment of the fuel cell according to the present invention.

The fuel cell 400 includes an MEA 410, a fuel inducing portion 420, a cathode-side pressing member 430, and an anode-side pressing member 440. A gas diffusion member (not shown) and a current collector (not shown) are provided on the anode side and the cathode side of the MEA 410, respectively.

In FIG. 7, the fuel cell 400 includes three paired catalyst bodies of a cathode-side catalyst body and an anode-side catalyst body on both sides of the MEA 410. The fuel cell 400 is an assembly of unit fuel cells (hereinafter, referred to as "cell") each having a pair of a cathode-side catalyst body and an anode-side catalyst body.

Specifically, the MEA 410 includes cathode-side catalyst bodies 412a, 412b, and 412c provided on one surface of a solid polymer electrolyte membrane 411 and three anode-side catalyst bodies (not shown) having substantially the same shape as the cathode-side catalyst bodies 412a, 412b, and 412c and provided on the other surface.

In FIG. 7, the MEA 410 has an outside dimension of 80×63×0.03 mm, and the cathode- and anode-side catalyst bodies have a size of 20×53×0.03 mm.

Similar to the first embodiment, the fuel inducing portion 420 includes an anode-side member 421 and a fuel introducing member 422.

The cathode-side pressing member 430 and the anode-side pressing member 440 have the same structure and function as those of the cathode-side pressing member 230 and the anode-side pressing member 240 according to the first embodiment shown in FIG. 2; therefore, redundant descriptions thereof will be omitted.

In addition, it is preferable that the gas diffusion member (not shown) and the current collector (not shown) have substantially the same shape as the cathode- and anode-side catalyst bodies provided in the MEA 410.

Figure 8:
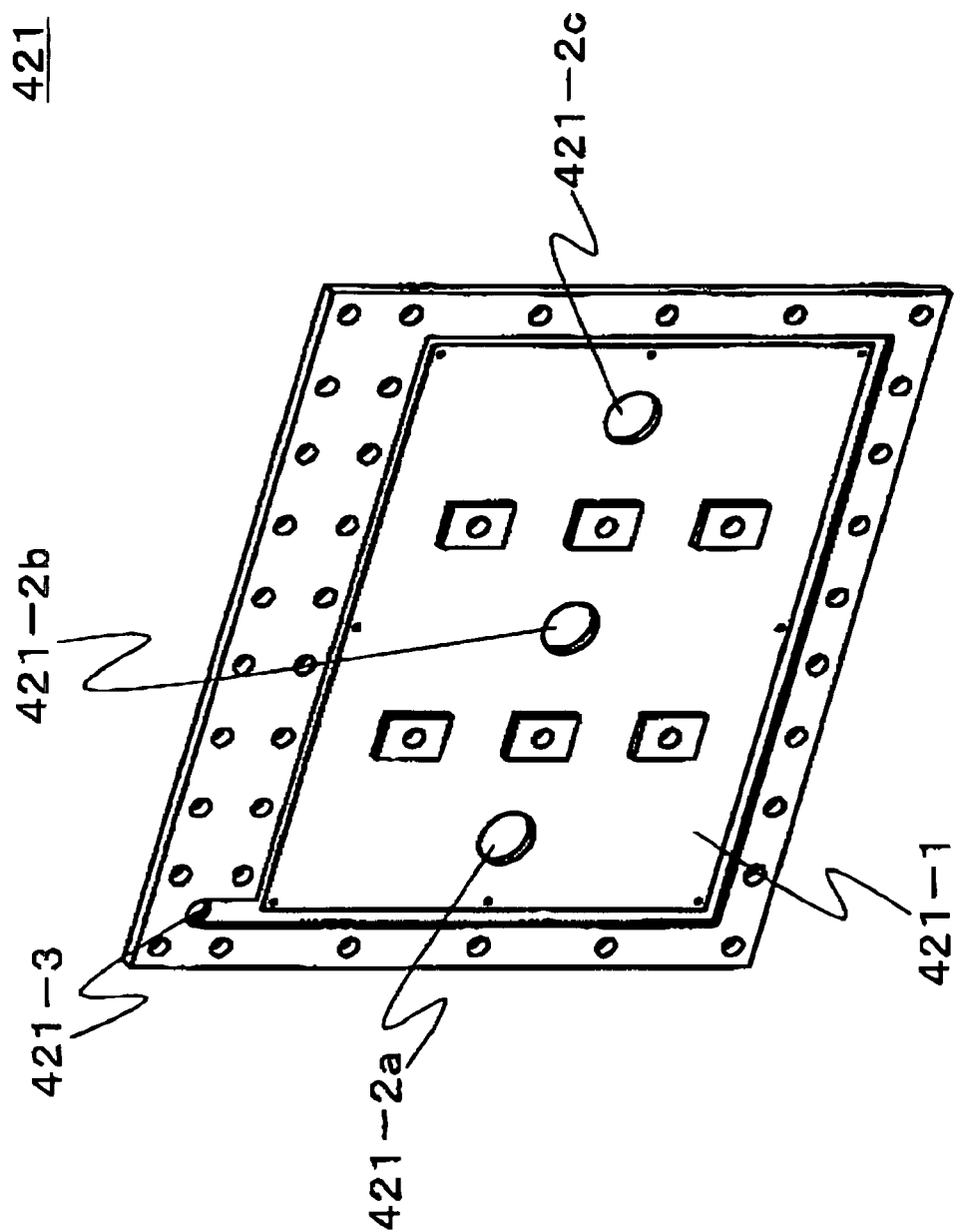
FIG. 8 is a perspective view showing the structure of an anode-side member of the fuel cell according to the first modified example of the first embodiment.

FIG. 8 is a diagram showing the structure of the anode-side member 421 of the fuel cell 400 shown in FIG. 7.

Similar to the anode-side member 221 of the first embodiment shown in FIG. 3, the anode-side member 421 includes a recess portion 421-1, a first through pore (through hole) 421-2b, second through pores (through holes) 421-2a and 421-2c, and a first discharge port 421-3.

The depth and shape of the recess portion 421-1 are the same as those of the recess portion 221-1 of the first embodiment; however, as shown in FIG. 8, convex portions may be formed into a shape that can reinforce the strength of the anode-side member 421 and that does not interfere with the diffusion of a hydrogen rich gas.

The first discharge port 421-3 has the same structure and function as the first discharge port 221-3 of the first embodiment; therefore, redundant descriptions thereof will be omitted.

The first through pore 421-2b and the second through pores 421-2a and 421-2c have their centers of gravity located on normal lines of the anode-side catalyst body surface drawn from the centers of the corresponding anode-side catalyst bodies.

The outside dimension of the anode-side member 421 shown in FIG. 8 and the depth of the recess portion 221-1 are the same as those of the first embodiment, and the first through pore 421-2b and the second through pores 421-2a and 421-2c have a diameter φ of 6 mm.

Figure 9:
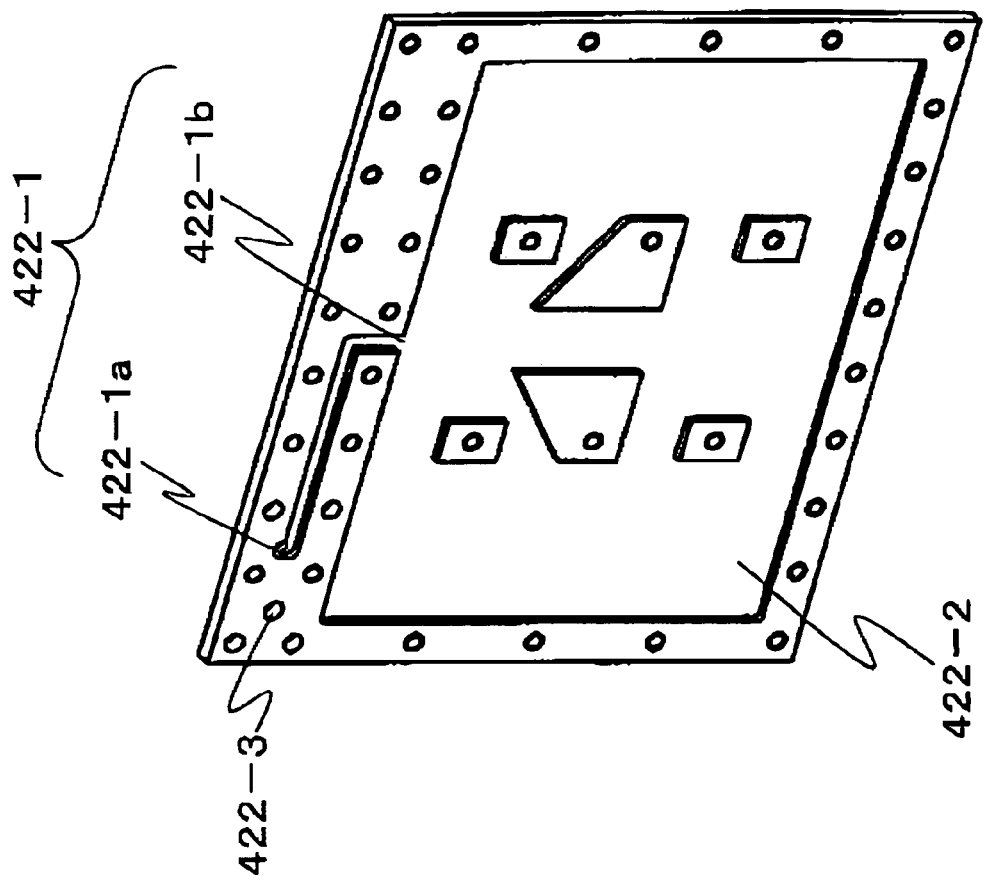
FIG. 9 is a perspective view showing the structure of a fuel introducing member of the fuel cell according to the first modified example of the first embodiment.

FIG. 9 is a diagram showing the structure of the fuel introducing member 422 of the fuel cell 400 shown in FIG. 7. The fuel introducing member 422 includes an introduction path 422-1, an induction path 422-2, and a second discharge port 422-3.

The introduction path 422-1 includes an introduction port 422-1a, which is a connecting portion to an external fuel supply portion 100 for introducing hydrogen from the outside, and a terminating port 422-1b, which is an end portion of the introduction path close to the induction path 422-2 described after.

The introduction port 422-1a and the terminating port 422-1b have the sane structure and functions as the introduction port 222-1a and the terminating port 222-1b in a basic example of the first embodiment; therefore, redundant descriptions thereof will be omitted.

Moreover, detailed descriptions on the second discharge port 422-3 are also omitted from the same reason.

The induction path 422-2 will be described in detail with reference to FIGS. 10 and 11.

The fuel introducing member 422 shown in FIG. 9 has substantially the same size as the fuel introducing member 222 of the first embodiment.

Figure 10:
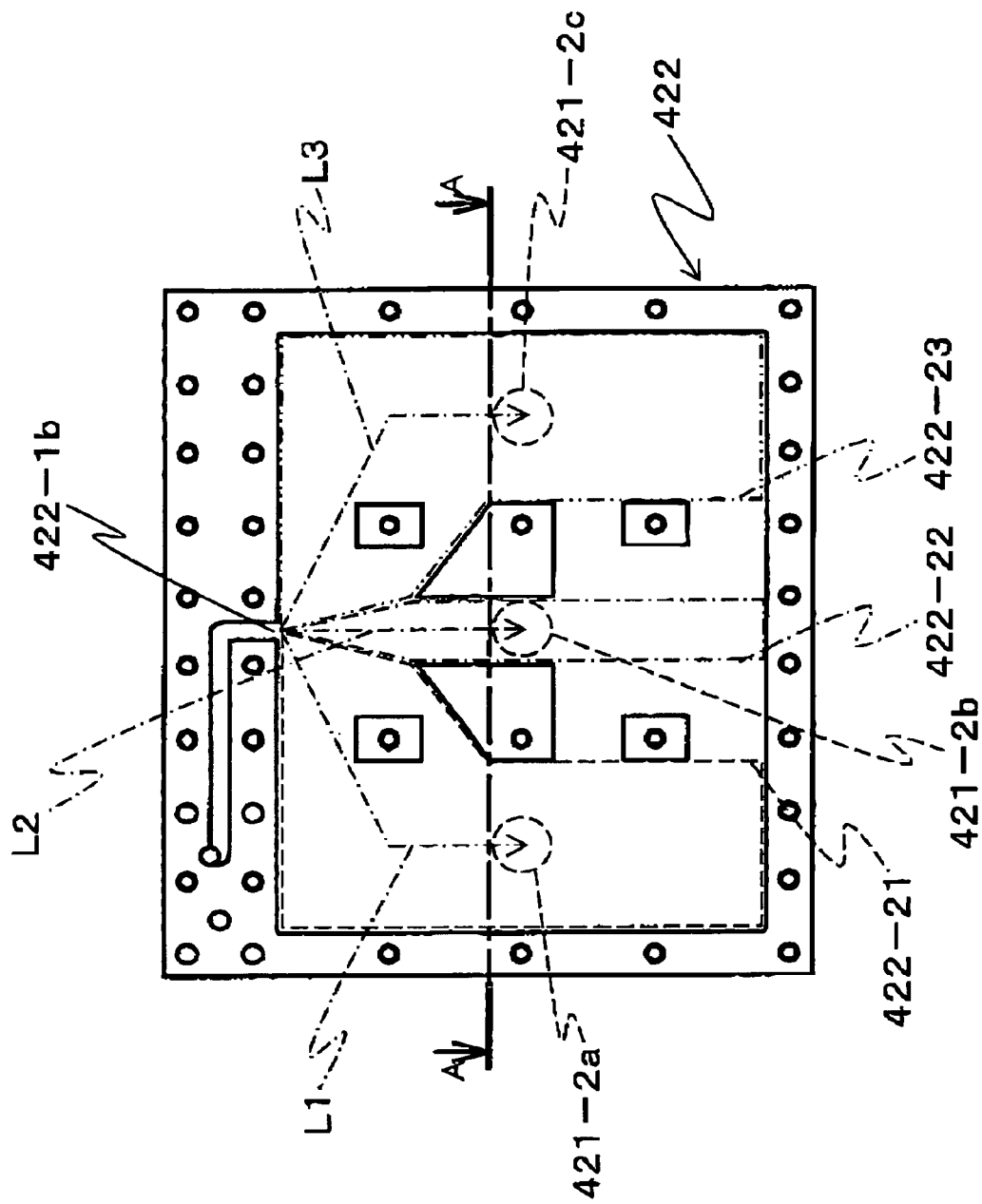
FIG. 10 is a front view showing the structure of the fuel introducing member shown in FIG. 9.

FIG. 10 is a front view of the fuel introducing member 422 shown in FIG. 9 as viewed from the anode-side catalyst body. FIG. 11 is a diagram showing the A-A cross section of FIG. 10.

In FIG. 10, the first through pore 421-2b and the second through pores 421-2a and 421-2c represent the positions of the first through pore 421-2b and the second through pores 421-2a and 421-2c when the anode-side member 421 and the fuel introducing member 422 are assembled with each other and when the fuel introducing member 422 is viewed from the anode-side catalyst body side.

Further, the length of the flow path of hydrogen flowing from the terminating port 422-1b toward the first through pore 421-2b is denoted by L2. Moreover, the lengths of the flow paths of hydrogen flowing from the terminating port 422-1b toward the second through pores 421-2a and 421-2c are denoted by L1 and L3, respectively.

Since convex portions are formed in the induction path 422-2 of FIG. 9, induction paths 422-22, 422-21, and 422-23 are formed to correspond to the first through pore 421-2b, the second through pores 421-2a and 421-2c. The induction path 422-22 forms a first induction path and the induction paths 422-21 and 422-23 form second induction paths.

The induction paths 422-21 and 422-23 have lengths L1 and L3 from the terminating port 422-1b to the through pores 421-2a and 421-2c, which are longer than the length L2 of the induction path 422-22. Specifically, in FIGS. 10 and 11, the lengths satisfy the relationship of $L1=L3>L2$.

Figure 11:
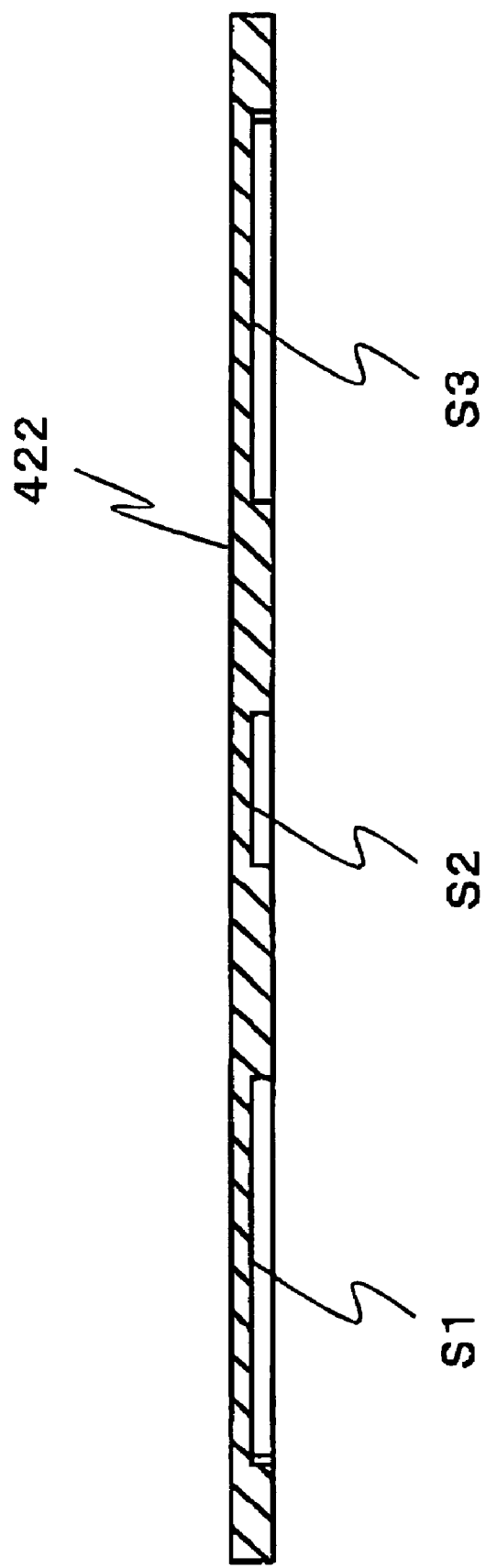
FIG. 11 is a cross sectional view showing the A-A cross section of FIG. 10.

In FIG. 11, S1, S2, and S3 represent cross sections of the lower surface of the induction path 422-2 corresponding to the induction paths 422-21, 422-22, and 422-23.

The induction path 422-2 is structured such that the induction path 422-22 has a cross section S2 smaller than the cross sections S1 and S3 of the induction paths 422-21 and 422-23. Specifically, in FIGS. 10 and 11, the cross sections satisfy the relationship of $S1=S3>S2$.

In addition, the induction paths 422-21, 422-22, and 422-23 only need to have a hydrogen flow path formed therein as long as the above-mentioned relationships are satisfied For example, the induction paths 422-21, 422-22, and 422-23 may be a pipe-shaped tube that connects the terminating port 222-1b to the respective through pores 421-2a, 421-2b, and 421-2c.

Next, simulation results when hydrogen is introduced to the fuel cell 400 having the fuel inducing portion 420 shown in FIG. 7 will be described.

The simulation was conducted using a hydrogen flow model that since hydrogen is consumed by the anode-side catalyst body during electricity generation in the fuel cell 400, a predetermined amount of hydrogen is flown out per unit time to the outside from the anode-side catalyst body surface.

In this simulation, pure hydrogen was introduced at a flow rate of 6.825E-8 [kg/s].

The hydrogen introduced from the terminating port 422-1b of the fuel introducing member 422 is supplied through the induction path 422-2 and through the first through pore 421-2b and the second through pores 421-2a and 421-2c of the anode-side member 421 to the anode-side catalyst body.

Figure 12:
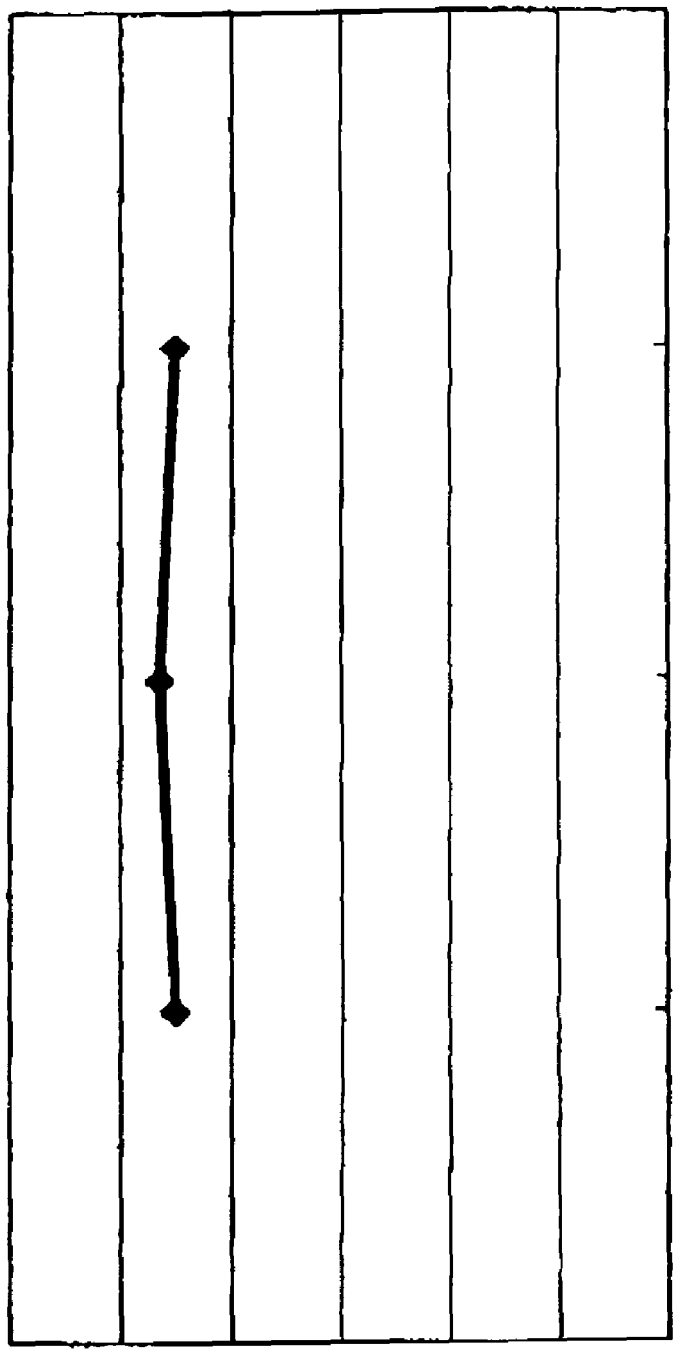
FIG. 12 is a graph showing a hydrogen flow rate of hydrogen flowing out from respective through pores of the anode-side member of the fuel cell according to the first modified example of the first embodiment.

FIG. 12 shows the flow rate of hydrogen calculated through simulation, showing the flow rate of hydrogen flowing out from the first through pore 421-2b and the second through pores 421-2a and 421-2c.

It was confirmed from FIG. 12 that with the structure of the present invention, even when the pore diameter of the through pores was made identical, the flow rates from the respective through pores were substantially the same with an error of 3.5 percent.

In addition, the output voltages of the three cells were substantially the same. Specifically, the output voltages of the cells corresponding to the first through pore 421-2b and the second through pores 421-2a and 421-2c were 0.165 V, 0.6225 V, and 0.621 V, respectively, with an error of 1.2 percent.

The length L2 of the induction path 422-22 was smaller than the lengths (L1 and L3) from the terminating port 422-1b to the through pores 421-2a and 421-2c. For this reason, if the induction path 422-22 and the induction paths 422-21 and 422-23 had the same cross sections, most of the hydrogen discharged from the terminating port 422-1b may have been more easily induced toward the first through pore 421-2b than the second through pores 421-2a and 421-2c. In such a case, the amount of hydrogen discharged from the first through pore 421-2b and the second through pores 421-2a and 421-2c may have fluctuated greatly.

However, in this modified example, the cross section S2 of the induction path 422-22 is smaller than the cross section (S1 and S3) of the induction paths 422-21 and 422-23. With this structure, it is not likely that most hydrogen flows to the induction path 422-22 but substantially the same amount of hydrogen is likely to flow in a distributed manner to the induction paths 422-21 to 422-23. Therefore, substantially the same amount of hydrogen can be sprayed onto the respective anode-side catalyst bodies.

In addition, since substantially the same amount of hydrogen can be sprayed onto the respective anode-side catalyst bodies, it is possible to suppress the unevenness in the output voltages corresponding to the respective anode-side catalyst bodies. Furthermore, since the respective output voltages of the anode-side catalyst bodies are prevented from becoming extremely lower than other output voltages, it is possible to increase the overall output voltage of the fuel cell.

Modified Example 2

In the first modified example, the through pores corresponding to the respective anode-side catalyst bodies have the same sizes. To the contrary, in the second modified example, the through pores corresponding to the respective anode-side catalyst bodies are not of the same sizes. The second modified example will be described in detail below.

Figure 13:
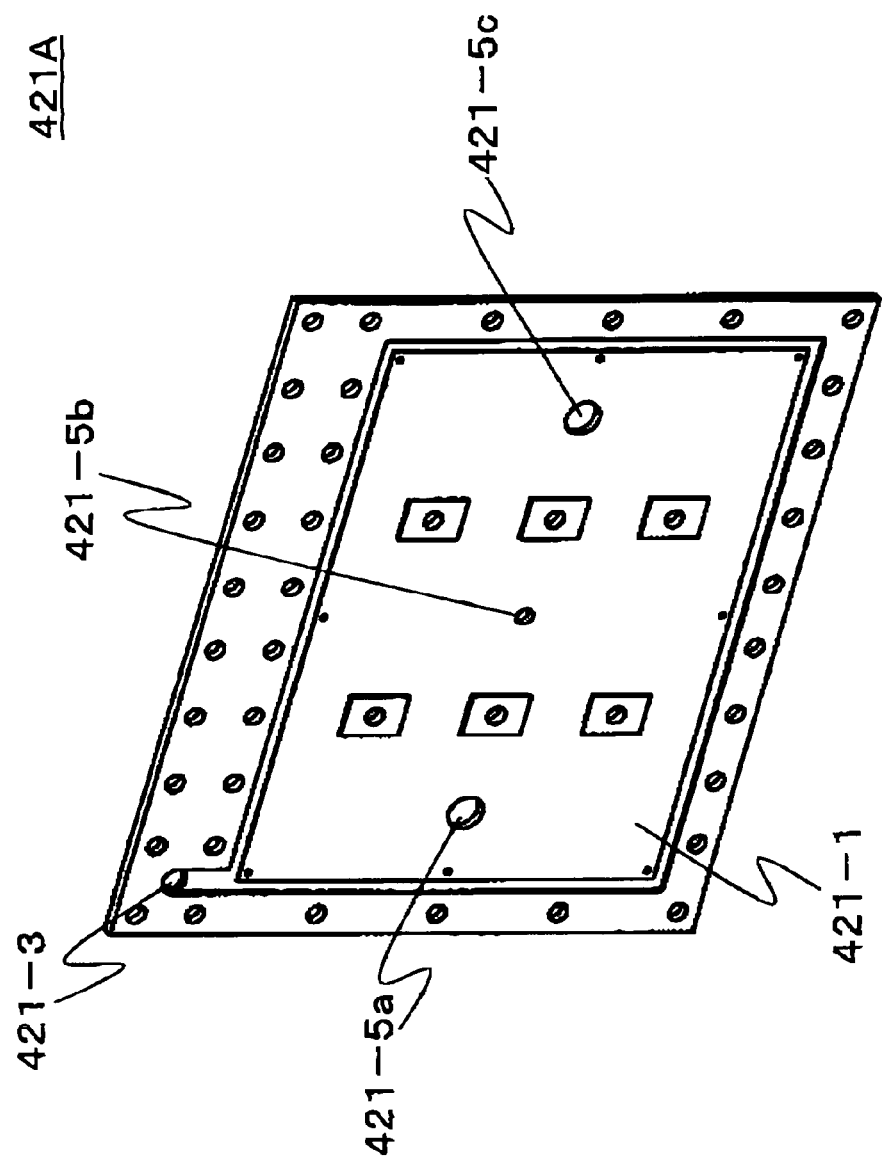
FIG. 13 is a perspective view showing the structure of an anode-side member of a fuel cell according to a second modified example of the first embodiment.

FIG. 13 is a diagram showing the structure of an anode-side member 421A according to the second modified example of the first embodiment of the fuel cell of the present invention.

The anode-side member 421A is the anode-side member corresponding to the MEA 410 of a planar, multi-electrode structure shown in FIG. 7 and is a modified example of the anode-side member 421 shown in FIG. 8.

In this modified example, the fuel introducing member 222 shown in FIG. 4 is used. The lengths from the terminating port 222-1b to a first through pore (through hole) 421-5b and second through pores (through holes) 421-5a and 421-5c of the anode-side member 421A are denoted by Lb, La, and Lc. Similar to the first modified example, the lengths satisfy the relationship of La=Lc>Lb.

Furthermore, the pore diameter φDb of the first through pore 421-5b and the pore diameters φDa and φDc of the second through pores 421-5a and 421-5c satisfy the relationship of Da=Dc>Db.

In the second modified example of the first embodiment shown in FIG. 13, the pore diameters are set such that Da=Dc=4 mm and Db=2 mm.

Next, simulation results when hydrogen is introduced to a fuel cell having a fuel inducing portion formed by the fuel introducing member 222 and the anode-side member 421A will be described.

Similar to the calculation performed in the first modified example of the first embodiment, pure hydrogen was introduced at a flow rate of 6.825E-8 [kg/s]. The hydrogen flow path is the same as that of the first modified example; therefore, redundant descriptions thereof will be omitted.

Figure 14:
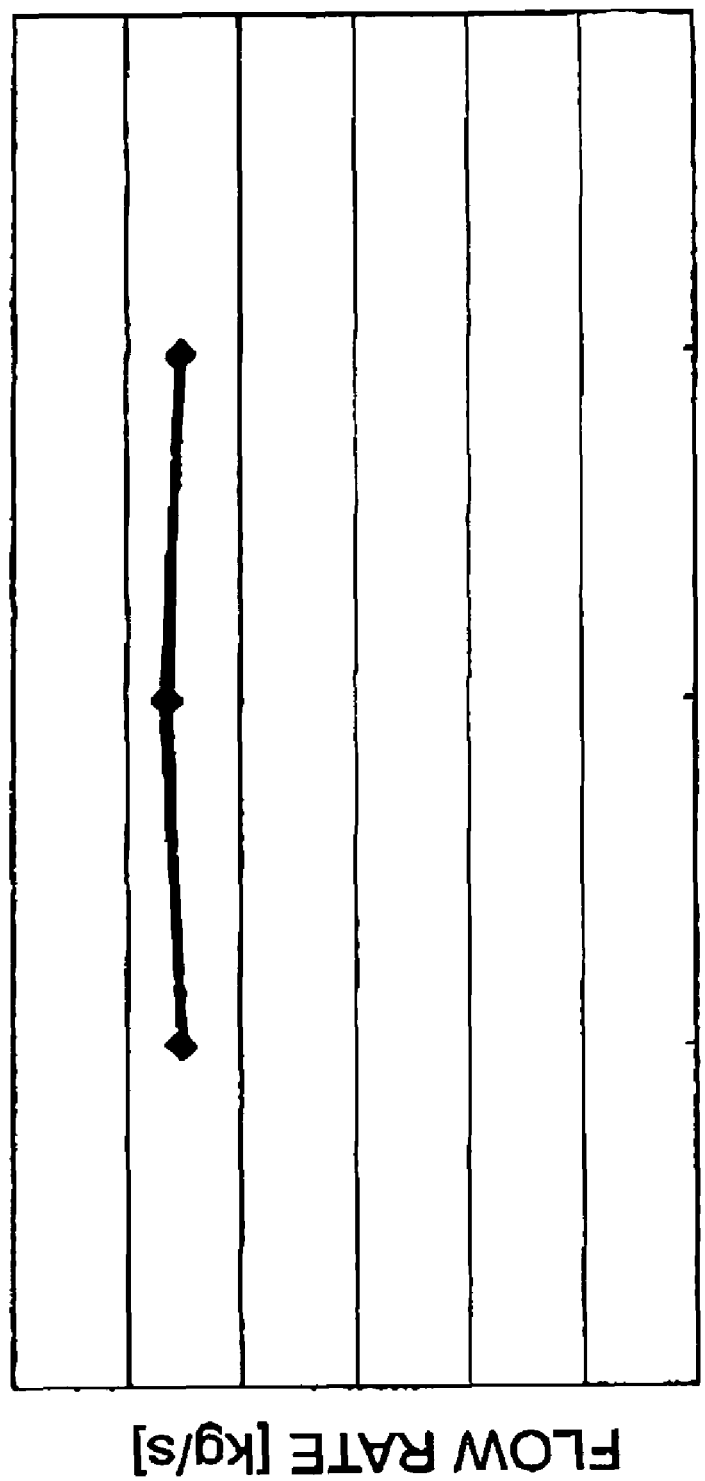
FIG. 14 a graph showing a hydrogen flow rate of hydrogen flowing out from respective through pores of the anode-side member of the fuel cell according to the second modified example of the first embodiment.

FIG. 14 shows the flow rate of hydrogen calculated through simulation, showing the flow rate of hydrogen flowing out from the first through pore 421-5b and the second through pores 421-5a and 421-5c.

It was confirmed from FIG. 14 that with the structure of the second modified example of the first embodiment, the flow rates from the respective through pores were substantially the same with an error of 2 percent.

The feasibility of the simulation and the correspondence between the unevenness of the hydrogen flow rate and the unevenness of the output voltage were described in connection with the first modified example of the first embodiment; therefore, redundant descriptions thereof will be omitted.

The first through pore 421-5b is disposed closer to the terminating port 222-1b than the second through pores 421-5a and 421-5c. For this reason, if the first through pore 421-5b and the second through pores 421-5a and 421-5c had the same sizes, most of the hydrogen discharged from the terminating port 222-1b may have been more easily induced toward the first through pore 421-5b than the second through pores 421-5a and 421-5c. In such a case, the amount of hydrogen discharged from the first through pore 421-5b and the second through pores 421-5a and 421-5c may have fluctuated greatly.

However, in this modified example, the size of the first through pore 421-5b is smaller than the sizes of the second through pores 421-5a and 421-5c. With this structure, it is not likely that most hydrogen is discharged from the first through pore 421-5b but substantially the same amount of hydrogen is likely to be discharged in a distributed manner from the first through pore 421-5b and the second through pores 421-5a and 421-5c. Therefore, substantially the same amount of hydrogen can be sprayed onto the respective anode-side catalyst bodies.

In addition, since substantially the same amount of hydrogen can be sprayed onto the respective anode-side catalyst bodies, it is possible to suppress the unevenness in the output voltages corresponding to the respective anode-side catalyst bodies. Furthermore, since the respective output voltages of the anode-side catalyst bodies are prevented from becoming extremely lower than other output voltages, it is possible to increase the overall output voltage of the fuel cell.

Embodiment 2

In the fuel inducing portion of the first embodiment, hydrogen is introduced toward the center of the surface of a single anode-side catalyst body. To the contrary, in a second embodiment, hydrogen is induced toward plural locations of the surface of a single anode-side catalyst body. The second embodiment will be described in detail below.

Figure 15:
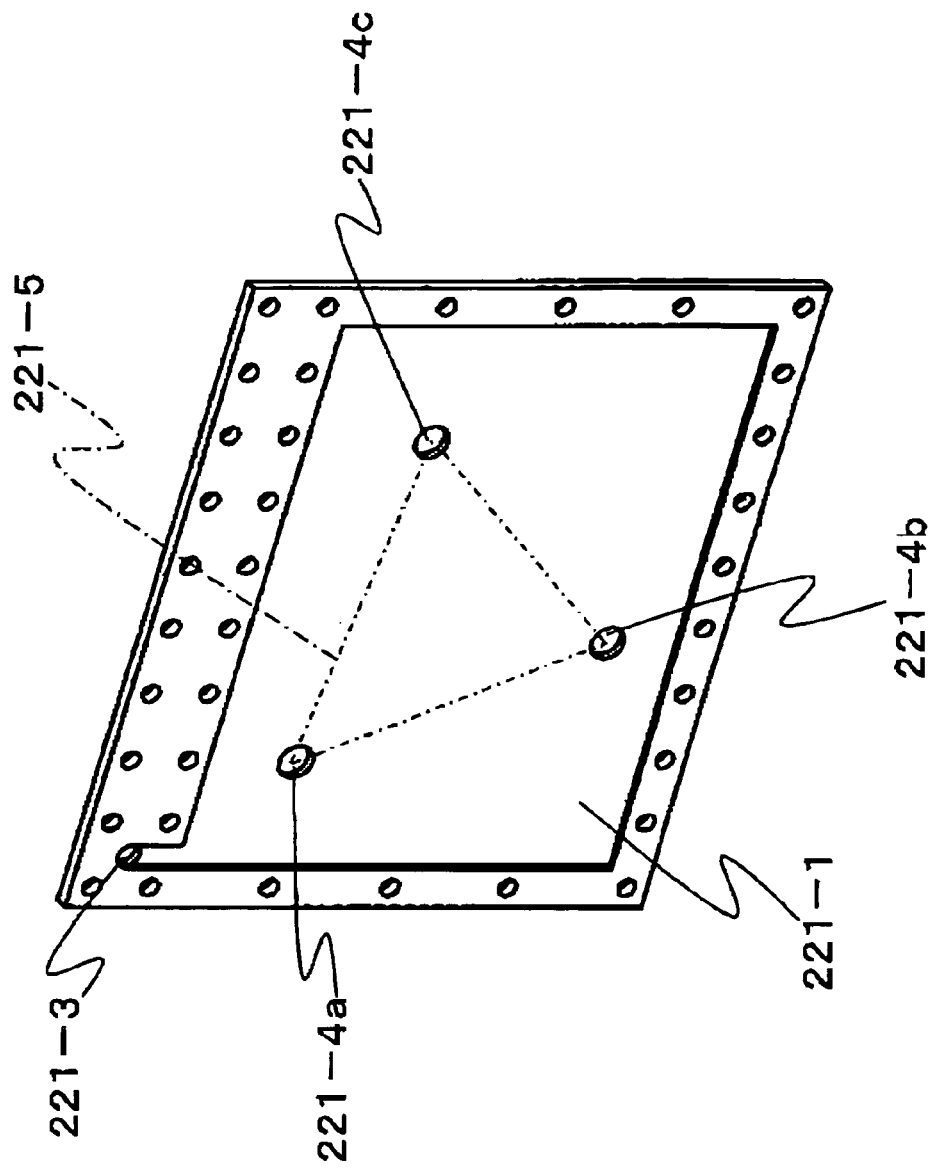
FIG. 15 is a perspective view showing the structure of an anode-side member of a fuel cell according to a second embodiment.

FIG. 15 is a diagram showing the structure of an anode-side member 221A according to the second embodiment of a fuel cell of the present invention.

The anode-side member 221A is a modified example of the anode-side member 221 of the fuel cell 200 shown in FIG. 2. The anode-side member 221A includes a recess portion 221-1 on a side where an anode-side catalyst body is disposed. A plurality of through pores 221-4a, 221-4b, and 221-4c are formed in the recess portion 221-1.

The anode-side member 221A has a triangular surface 221-5 (polygonal surface) formed by the lines passing through the above-mentioned three through pores. In a front view of the anode-side member 221A as viewed from the cathode side, the triangular surface 221-5 is disposed at a position overlapping the surface of the anode-side catalyst body.

In this embodiment, the above-mentioned three through pores are arranged such that a normal line of the anode-side catalyst body surface passing through the center (the center of gravity) of the anode-side catalyst body passes through the inner side of the triangular surface 221-5.

According to this embodiment, since a plurality of through pores is provided, an overall opening area can be increased larger than that when only one through pore is provided. With this arrangement, the flow rate of the hydrogen discharged from the through pores can be decelerated to be lower than that when only one through pore is provided. Therefore, the hydrogen can be sprayed at substantially uniform pressure with respect to the anode-side catalyst body. Accordingly, it is possible to make the hydrogen density distribution on the anode-side catalyst body more uniform.

In additions the triangular surface 221-5 is disposed at a position overlapping the center (the center of gravity) of the surface of the anode-side catalyst body in a front view of the anode-side body 221A as viewed from the cathode side. For this reason, the hydrogen discharged from the respective through pores can be sprayed with more uniform pressure with respect to the surface of the anode-side catalyst body.

Further, the through pores 221-4a, 221-4b, and 221-4c may have arbitrary pore sizes; however, it is preferable that they are substantially of the same circular shape. The above-mentioned normal line may pass through the center of a circumscribed circle of the triangular surface 221-5.

In addition, in this embodiment, three through pores are provided; however, two through pores may be provided, and in such a case, it is preferable that the above-mentioned normal line passes through the middle point of the distance between the centers of the two through pores.

Furthermore, in this embodiment, the fuel introducing member may have a structure having a single induction path, similar to the fuel introducing member 222 described in the first embodiment, it is preferable that the fuel introducing portion has induction paths provided for the respective through pores and that the cross sections of the induction paths and the distances from the introduction path to the respective through pores satisfy the relationship described in the first modified example of the first embodiment.

Modified Example 1

In the second embodiment, the anode-side member 221A includes the triangular surface 221-5 formed by the lines passing through the three through pores. To the contrary, in a first modified example, an anode-side member 221B has a rectangular surface 221-7 formed by the lines passing through four through pores. The first modified example will be described in detail below.

Figure 16:
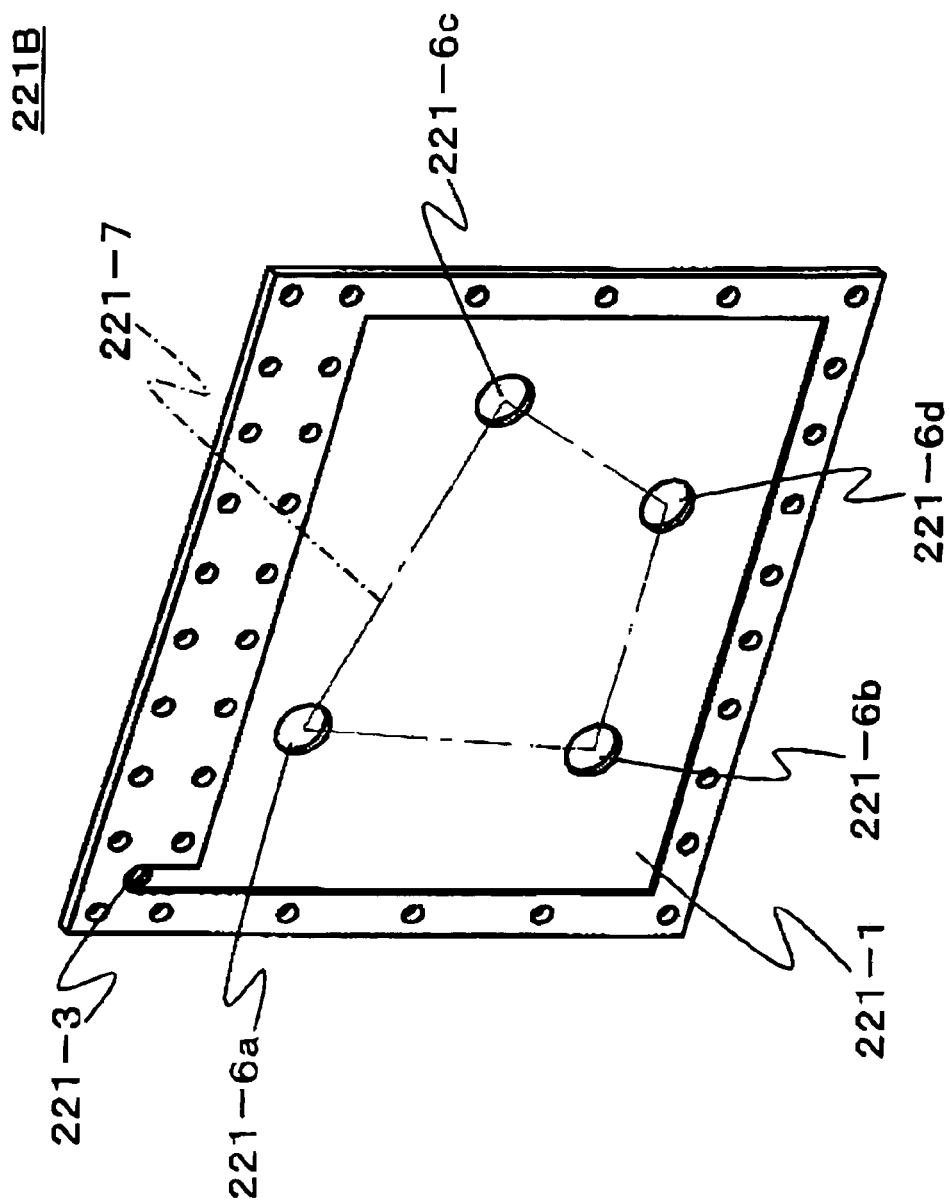
FIG. 16 is a perspective view showing the structure of an anode-side member of a fuel cell according to a first modified example of the second embodiment.

FIG. 16 is a diagram showing the structure of the anode-side member 221B according to the first modified example of the second embodiment.

The anode-side member 221B includes through pores 221-6a, 221-6b, 221-6c, and 221-6d.

In a front view of the anode-side member 221B as viewed from the cathode side, the rectangular surface 221-7 is disposed at a position overlapping the surface of the anode-side catalyst body.

In this modified example, the above-mentioned four through pores are arranged such that a normal line of the anode-side catalyst body surface passing through the center (the center of gravity) of the anode-side catalyst body passes through the inner side of the rectangular surface 221-7.

The through pores 221-6a, 221-6b, 221-6c, and 221-6d may have arbitrary pore sizes; however, it is preferable that they are substantially of the same circular shape. The above-mentioned normal line may pass through the center of gravity of the rectangular surface 221-7.

In addition, in this modified example of the present embodiment, four through pores are provided; however, five or more through pores may be provided. Further, even in the case where five or more through pores are provided, the positional relationship of the through pores is the same as that described above; therefore, redundant descriptions thereof will be omitted.

Further, when the centers of the through pores are connected to form a polygonal surface having a point having a vertex angle equal to or greater than 180 degrees, it is preferable that the through pores are arranged such that all the remaining points of the polygonal surface have a vertex angle equal to or smaller than 180 degrees and that the center of gravity of an arbitrary polygonal surface containing all the through pores passes through the above-mentioned normal line.

In this modified example of the present embodiment, the induction path of the fuel introducing member has the same shape as the second embodiment; therefore, redundant descriptions thereof will be omitted.

According to this embodiment, since a plurality of through pores is provided, an overall opening area can be increased larger than that when only one through pore is provided. With this arrangement, the flow rate of the hydrogen discharged from the through pores can be decelerated to be lower than that when only one through pore is provided. Therefore, the hydrogen can be sprayed at substantially uniform pressure with respect to the anode-side catalyst body. Accordingly, it is possible to make the hydrogen density distribution on the anode-side catalyst body more uniform.

Specifically, since four through pores are provided, compared with the case where three through pores are provided, the hydrogen discharged from the respective through pores can be sprayed with more uniform pressure with respect to the anode-side catalyst body.

Modified Example 2

In the second embodiment, hydrogen is induced toward plural locations of the surface of a single anode-side catalyst body. To the contrary, in a second modified example, hydrogen is induced toward plural locations of the respective surfaces of plural anode-side catalyst bodies. The second modified example will be described in detail below.

Figure 17:
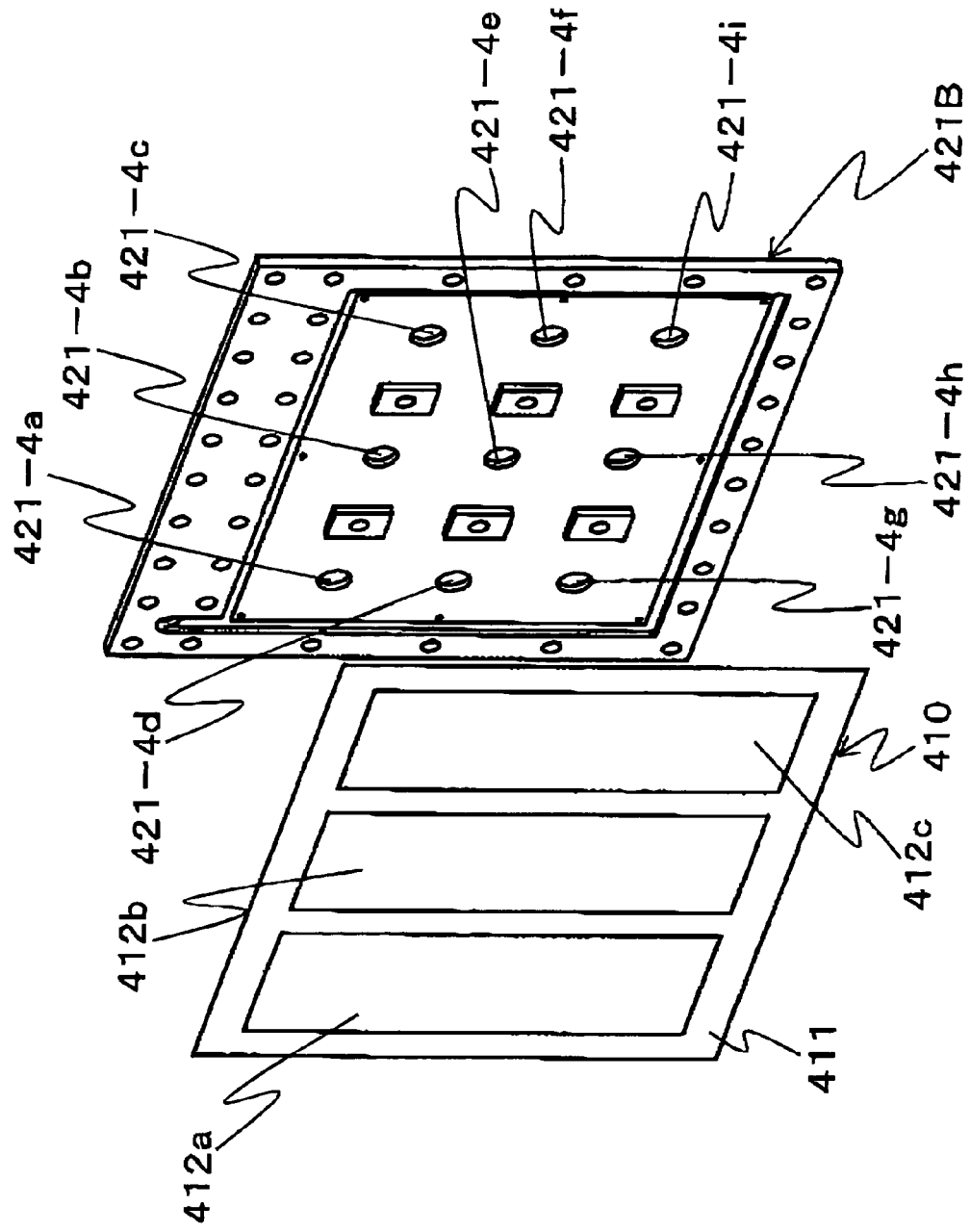
FIG. 17 is a perspective view showing the structure of an anode-side member of a fuel cell according to a second modified example of the second embodiment.

FIG. 17 is a diagram showing the structure of an anode-side member 421B and the MEA 410 according to the second modified example of the second embodiment.

The anode-side member 421B includes nine through pores (through holes) 421-4a, 421-4b, 421-4c, 421-4d, 421-4e, 421-4f, 421-49, 421-4h, and 421-4i so that three through pores correspond to each of the anode-side catalyst bodies provided to the MEA 410.

Specifically, in FIG. 17, the through pores 421-4a, 421-4d, and 421-4g are provided to correspond to the anode-side catalyst body that is opposed to the cathode-side catalyst body 412a via the MEA 410.

Further, the through pores 421-4b, 421-4e, and 421-4h are provided to correspond to the anode-side catalyst body that is opposed to the cathode-side catalyst body 412b via the MEA 410.

Furthermore, the through pores 421-4c, 421-4f, and 421-4i are provided to correspond to the anode-side catalyst body that is opposed to the cathode-side catalyst body 412c via the MEA 410.

In this modified example, the three through pores corresponding to a single anode-side catalyst body are arranged in a row; however, it is to be noted that the invention is not limited to this. For example, the three through pores corresponding to a single anode-side catalyst body may be disposed at positions as shown in FIG. 15.

Further, the three through pores may be arranged at equal intervals along a straight line. In addition, it is preferable that among the plural through pores arranged at equal intervals, the central through pore is disposed at a position that the above-mentioned normal line passes through.

In this way, since the fuel supplied from the outside is induced toward plural locations of the respective surfaces of the plural anode-side catalyst bodies, it is possible to make the fuel density distribution in the anode-side catalyst body surface of each cell more uniform and thus to make the fuel supply amount uniform between the cells. With this arrangement, it is possible to suppress unevenness in an output voltage between the cells and thus to increase an overall output voltage of the fuel cell.

Embodiment 3

Figure 18:
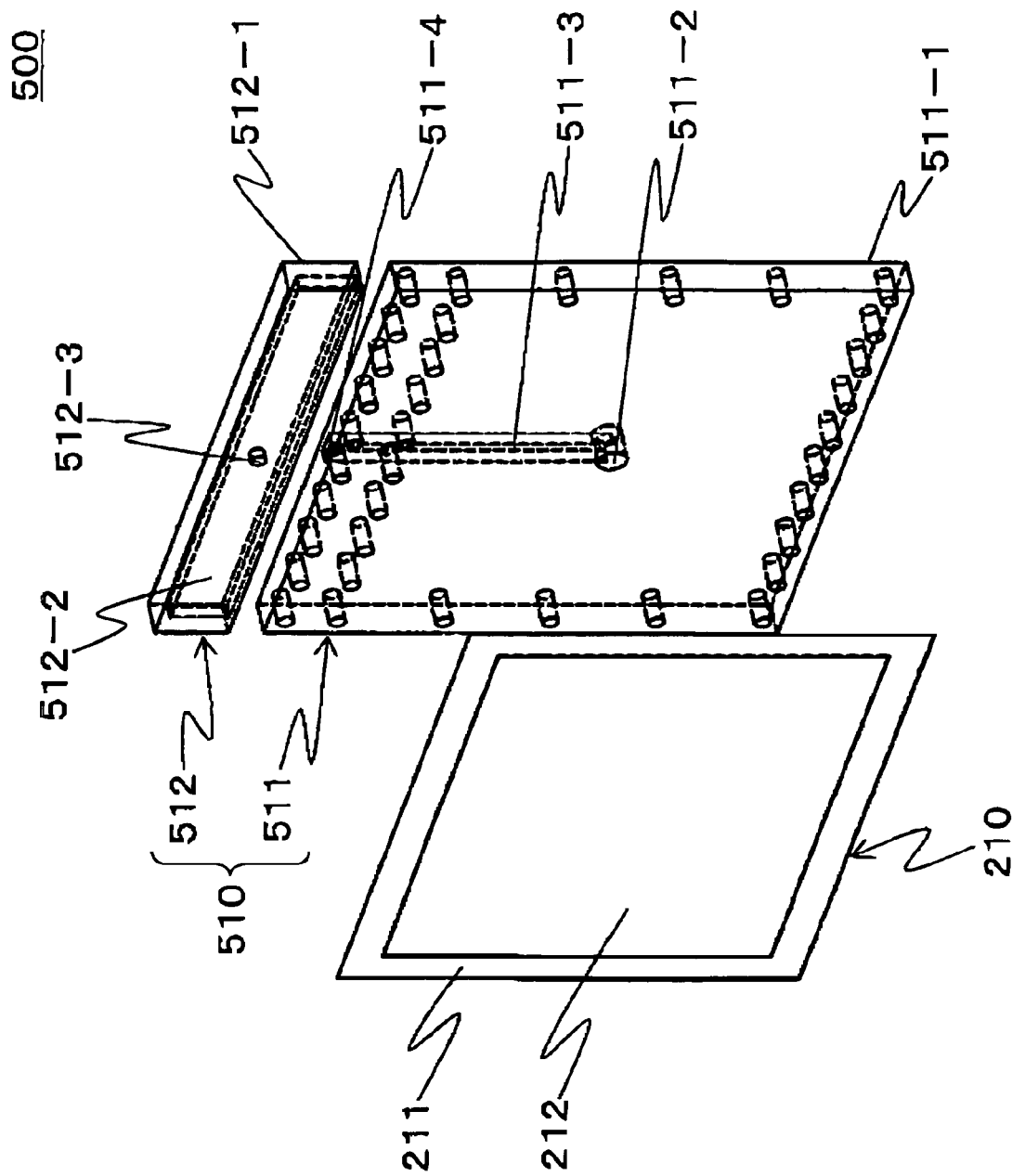
FIG. 18 is a perspective view showing the structure of a fuel cell according to a third embodiment.

FIG. 18 is a diagram showing the structure of a third embodiment of the fuel cell of the present invention.

In FIG. 18, a fuel cell 500 includes an MEA 210, a fuel inducing portion 510, a cathode-side pressing member (not shown), an anode-side pressing member (not shown), a gas diffusion member (not shown), and a current collector.

The MEA 210 includes a solid polymer electrolyte membrane 211, a cathode-side catalyst body 212 and an anode-side catalyst body (not shown) disposed on opposite surfaces of the solid polymer electrolyte membrane.

The fuel inducing portion 510 includes an anode-side member 511 and a fuel introducing member 512.

In the first and second embodiments, the fuel introducing member is disposed at a side opposite to the side at which the anode-side catalyst body is opposed to the solid polymer electrolyte membrane 211 so as to be in parallel to the anode-side member via the anode-side member.

To the contrary, in this embodiment, the fuel introducing member 512 can be disposed at an arbitrary position adjacent to the anode-side member 511. Specifically, the fuel introducing member 512 can be disposed at a position where the anode-side member 511 is at the substantially same surface as the fuel introducing member 512.

The anode-side member 511 includes a first plate member 511-1, a supply port 511-2, an introduction path 511-3, and a connecting port 511-4.

The supply port 511-2 is provided to supply hydrogen to the anode-side catalyst body. The supply port 511-2 is not penetrated but is an opening formed at a side where the first plate member 511-1 is opposed to the anode-side catalyst body. The supply port 511-2 is disposed on a normal line of the anode-side catalyst body surface and is also disposed on a line passing through the center of the anode-side catalyst body.

The introduction port 511-3 is provided to induce the hydrogen introduced from the connecting port 511-4 toward the supply port 511-2. The introduction port 511-3 is formed into a tube shape along the surface direction of the first plate member 511-1. The connecting port 511-4 is connected to the fuel introducing member 512.

It is to be noted that only one supply port 511-2 may be provided for a single anode-side catalyst body as shown in FIG. 18 and plural supply ports may be provided for a single anode-side catalyst body.

Further, when plural supply ports are provided, it is preferable that for a supply port 511-2A disposed at a small distance from the connecting port 511-4, the cross section of an introduction path 511-3A connected to the supply port 511-2A is small, while for a supply port 511-2B disposed at a large distance from the connecting port 511-4, the cross section of the introduction path 511-3B connected to the supply port 511-2B is large.

Alternatively, the introduction paths from the connecting port 511-4 to the respective supply ports may be formed to have the same cross sections, and the supply port 511-2A disposed at a small distance from the connecting port 511-4 may be formed to have a small area while the supply port 511-2B disposed at a large distance from the connecting port 511-4 may be formed to have a large area.

The fuel introducing member 512 includes a second plate member 512-1, an induction path 512-2, and an introduction port 512-3.

The introduction port 512-3 is connected to an external fuel supply portion 100 and supplies hydrogen to the induction path 512-2.

The introduction port 512-3 may be provided at an arbitrary position of the second plate member 512-1. In addition, the introduction port 512-3 may have an arbitrary shape. When connecting the anode-side member 511 and the fuel introducing member 512, the introduction port 512-3 is preferably constructed such that it is opened in an axial direction different from a normal line of the connecting surface.

It is to be noted that the induction path 512-2 is a space formed in the second plate member 512-1 and may function as a buffer when hydrogen is supplied. That is, the induction path 512-2 may be constructed to decelerate the speed of introduced hydrogen to be lower than that when it was introduced.

By having the above-described structure, the position of the fuel introducing member 512 can be set arbitrarily, thereby improving the degree of freedom in designing a layout of the fuel introducing member 512 and thus contributing to downsizing the thickness of the fuel cell.

Other Embodiments

Hereinabove, examples of the present invention have been described by way of specific examples thereof. However, it is to be noted that the present invention is not limited to these example but various modifications in design can be appropriately made to the detailed structure of the above-described embodiments.

The detailed structures shown in the embodiments and the modified examples may be combined with each other. The operations and effects of the embodiments are merely enumerations of the best feasible operations and effects incurred from the present invention, and the operation and effect of the present invention are not limited to those described in the embodiments.

In all of the embodiments described above, the fuel is not limited to hydrogen and any fuel such as methanol solution can be used as long as it allows extracting protons and electrons from a catalyst body of an MEA.

As an effect of all of the embodiments described above, in particular, in a fuel cell having a dead-end structure with no outlet port, only hydrogen necessary for electricity generation is supplied; therefore, compared with the conventional technology (flow structure) in which the hydrogen density in the vicinity of the introduction port is higher than the hydrogen density at a portion on the anode-side catalyst body disposed farthest from the introduction port, with the structure of the present invention, it is possible to provide a more uniform hydrogen density distribution and thus to contribute to increasing the overall output of the fuel cell.

Further, the dead-end structure as used in this embodiment refers to a structure in which the fuel inducing portion induces the introduced fuel only toward the anode-side catalyst body and in which the hydrogen is not induced to the outside. On the other hand, the flow structure refers to a structure in which the fuel inducing portion induces the introduced fuel to both the anode-side catalyst body and the outside.

INDUSTRIAL APPLICABILITY

According to the fuel cell of the present invention, it is possible to suppress unevenness in a hydrogen density distribution and to increase an output voltage.

The invention claimed is:

1. A fuel cell, comprising:
a solid polymer electrolyte membrane;
a plurality of anode-side catalyst bodies and at least one cathode-side catalyst body disposed on opposite surfaces of the solid polymer electrolyte membrane; and
a fuel inducing portion that is disposed on a side opposite to the side at which the anode-side catalyst bodies are opposed to the solid polymer electrolyte membrane so as to be opposed to surfaces of the anode-side catalyst bodies and that induces fuel supplied from outside the fuel cell in directions primarily toward the centers of the surfaces of the anode-side catalyst bodies.

2. The fuel cell according to claim 1, wherein the fuel inducing portion decelerates the speed of fuel lower than that when the fuel was supplied from the outside.

3. The fuel cell according to claim 1, wherein the fuel inducing portion induces the fuel supplied from the outside toward the anode-side catalyst bodies along a direction of a normal line of the anode-side catalyst bodies.

4. The fuel cell according to claim 1, wherein the fuel inducing portion includes an anode-side member disposed apart from the anode-side catalyst bodies so as to be opposed to the anode-side catalyst bodies, and
wherein the anode-side member includes through pores at positions corresponding to the centers of respective surfaces of the anode-side catalyst bodies.

5. The fuel cell according to claim 4,
wherein the fuel inducing portion includes:
an introduction path through which the fuel is supplied; and
induction paths connected to the introduction path and through which the fuel supplied to the introduction path is induced to the through pores,
wherein the introduction path includes a terminating port connected to the induction paths,
wherein the induction paths include a first induction path and second induction paths of which the lengths from the terminating port to the through pores are longer than that of the first induction path, and
wherein the first induction path has a cross section smaller than those of the second induction paths.

6. The fuel cell according to claim 4,
wherein the fuel inducing portion includes:
an introduction path through which the fuel is supplied; and
an induction path connected to the introduction path and through which the fuel supplied to the introduction path is induced to the through pores,
wherein the introduction path includes a terminating port connected to the induction path,
wherein the plural through pores include a first through pore and second through pores that are disposed at positions at which the distances to the terminating port are longer than that of the first through pore, and
wherein the first through pore has an area smaller than those of the second through pores.

7. A fuel cell, comprising:
a solid polymer electrolyte membrane;
a plurality of anode-side catalyst bodies and at least one cathode-side catalyst body disposed on opposite surfaces of the solid polymer electrolyte membrane; and
a fuel inducing portion that is disposed on a side opposite to the side at which the anode-side catalyst bodies are opposed to the solid polymer electrolyte membrane so as to be opposed to surfaces of the anode-side catalyst bodies and that induces fuel supplied from outside the fuel cell toward the surfaces of the anode-side catalyst bodies, the fuel inducing portion including an anode-side member opposed to the anode-side catalyst bodies and having through pores that face the surfaces of the respective anode-side catalyst bodies, an introduction path through which the fuel is supplied, and induction paths connected to the introduction path and through which the fuel supplied to the introduction path is induced to the through pores,
wherein the introduction path includes a terminating port connected to the induction paths,
wherein the induction paths include a first induction path and second induction paths of which the lengths from the terminating port to the through pores are longer than that of the first induction path, and
wherein the first induction path has a cross section smaller than those of the second induction paths.

8. The fuel cell according to claim 7, wherein the fuel inducing portion decelerates the speed of fuel lower than that when the fuel was supplied from the outside.

9. The fuel cell according to claim 7, wherein the fuel inducing portion induces the fuel supplied from the outside along a direction of a normal line of the anode-side catalyst bodies.

10. A fuel cell comprising:

a solid polymer electrolyte membrane;

a plurality of anode-side catalyst bodies and at least one cathode-side catalyst body disposed on opposite surfaces of the solid polymer electrolyte membrane; and a fuel inducing section that is disposed opposite the surface of the solid polymer electrolyte membrane on which the anode-side catalyst bodies are disposed and that directs fuel supplied from outside the fuel cell toward the centers of surfaces of the anode-side catalyst bodies that face the fuel inducing section so that the fuel diffuses radially outwardly away from the centers over the entire surfaces of the anode-side catalyst bodies.

11. A fuel cell according to claim 10; wherein the fuel inducing section has a plurality of through holes which are at positions corresponding to and facing respective centers of the surfaces of the anode-side catalyst bodies and through which the fuel is directed.

12. A fuel cell according to claim 11; wherein the fuel inducing section directs the fuel in a direction normal to the surfaces of the anode-side catalyst bodies.

13. A fuel cell according to claim 11; wherein the fuel inducing section includes an introduction path through which the fuel is supplied, and induction paths connected to a terminating port of the introduction path and through which fuel supplied to the introduction path is supplied to the respective through holes, the induction paths including a first induction path that supplies fuel to a first through hole and second induction paths that supply fuel to second through holes.

14. A fuel cell according to claim 13; wherein the lengths of the second induction paths from the terminating port to the second through holes are longer than the length of the first induction path from the terminating port to the first through hole.

15. A fuel cell according to claim 14; wherein the first induction path has a cross section smaller than the cross sections of the second induction paths.

16. A fuel cell according to claim 11; wherein the fuel inducing section includes an introduction path through which the fuel is supplied, and an induction path connected to a terminating port of the introduction path and through which the fuel supplied to the introduction path is supplied to the through holes, the through holes including a first through hole and second through holes that are disposed at positions at which the distances to the terminating port are longer than that of the first through hole, and the first through hole having an area smaller than the areas of the second through holes.

17. A fuel cell according to claim 10; wherein the fuel inducing section includes an anode-side member disposed apart from and opposed to the anode-side catalyst bodies, the anode-side member having through holes which are at positions corresponding to and facing respective centers of the surfaces of the anode-side catalyst bodies and through which the fuel is directed.

18. A fuel cell according to claim 17; wherein the anode-side member comprises a plate member having a recess portion which faces the anode-side catalyst bodies and in which are located the through holes.

* * * * *